(12) United States Patent
Tsai et al.

(10) Patent No.: US 9,332,319 B2
(45) Date of Patent: May 3, 2016

(54) AMALGAMATING MULTIMEDIA TRANSCRIPTS FOR CLOSED CAPTIONING FROM A PLURALITY OF TEXT TO SPEECH CONVERSIONS

(75) Inventors: Johney Tsai, Irvine, CA (US); Matthew Miller, Rancho Santa Margarita, CA (US); David Strong, Laguna Niguel, CA (US)

(73) Assignee: Unisys Corporation, Blue Bell, PA (US)

( * ) Notice: Subject to any disclaimer, the term of this patent is extended or adjusted under 35 U.S.C. 154(b) by 136 days.

(21) Appl. No.: 12/890,744

(22) Filed: Sep. 27, 2010

(65) Prior Publication Data

US 2012/0078626 A1   Mar. 29, 2012

(51) Int. Cl.
*G10L 15/32*        (2013.01)
*G10L 15/183*       (2013.01)
*G10L 15/26*        (2006.01)
*H04N 21/488*       (2011.01)

(52) U.S. Cl.
CPC ............ *H04N 21/4884* (2013.01); *G10L 15/26* (2013.01)

(58) Field of Classification Search
CPC ....... G10L 15/26; G10L 15/32; G10L 15/183; G06F 17/3002; H04N 21/4884
USPC .......................... 704/235, 244, 246, 255, 278
See application file for complete search history.

(56) References Cited

U.S. PATENT DOCUMENTS

| | | | | |
|---|---|---|---|---|
| 5,553,119 A | * | 9/1996 | McAllister et al. | 379/88.01 |
| 5,754,978 A | * | 5/1998 | Perez-Mendez | G10L 15/32 |
| | | | | 704/239 |
| 6,122,613 A | * | 9/2000 | Baker | 704/235 |
| 6,477,491 B1 | * | 11/2002 | Chandler et al. | 704/235 |
| 6,526,380 B1 | * | 2/2003 | Thelen et al. | 704/251 |
| 6,535,848 B1 | * | 3/2003 | Ortega et al. | 704/235 |
| 6,785,654 B2 | * | 8/2004 | Cyr | G10L 15/32 |
| | | | | 704/257 |
| 6,996,525 B2 | * | 2/2006 | Bennett | G10L 15/32 |
| | | | | 704/231 |
| 7,013,273 B2 | * | 3/2006 | Kahn | 704/235 |
| 7,221,405 B2 | * | 5/2007 | Basson | G09B 19/08 |
| | | | | 345/7 |
| 7,930,624 B2 | * | 4/2011 | Phillips et al. | 715/201 |
| 8,370,142 B2 | * | 2/2013 | Frankel et al. | 704/235 |
| 2002/0193991 A1 | * | 12/2002 | Bennett | G10L 15/32 |
| | | | | 704/247 |
| 2003/0115053 A1 | * | 6/2003 | Eide et al. | 704/231 |
| 2003/0144837 A1 | * | 7/2003 | Basson et al. | 704/231 |
| 2004/0138885 A1 | * | 7/2004 | Lin | G10L 15/32 |
| | | | | 704/240 |
| 2004/0210437 A1 | * | 10/2004 | Baker | 704/251 |
| 2005/0060145 A1 | * | 3/2005 | Abe et al. | 704/211 |
| 2005/0065790 A1 | * | 3/2005 | Yacoub | G10L 15/32 |
| | | | | 704/231 |
| 2007/0118373 A1 | * | 5/2007 | Wise et al. | 704/235 |
| 2007/0118374 A1 | * | 5/2007 | Wise et al. | 704/235 |
| 2007/0198261 A1 | * | 8/2007 | Chen | 704/240 |
| 2007/0288518 A1 | * | 12/2007 | Crigler et al. | 707/104.1 |

(Continued)

*Primary Examiner* — Martin Lerner
(74) *Attorney, Agent, or Firm* — Richard J. Gregson

(57) ABSTRACT

Methods and systems for converting speech to text are disclosed. One method includes analyzing multimedia content to determine the presence of closed captioning data. The method includes, upon detecting closed captioning data, indexing the closed captioning data as associated with the multimedia content. The method also includes, upon failure to detect closed captioning data in the multimedia content, extracting audio data from multimedia content, the audio data including speech data, performing a plurality of speech to text conversions on the speech data to create a plurality of transcripts of the speech data, selecting text from one or more of the plurality of transcripts to form an amalgamated transcript, and indexing the amalgamated transcript as associated with the multimedia content.

22 Claims, 19 Drawing Sheets

(56) References Cited

U.S. PATENT DOCUMENTS

| | | | |
|---|---|---|---|
| 2008/0175556 A1* | 7/2008 | Dorai et al. | 386/52 |
| 2009/0018833 A1* | 1/2009 | Kozat et al. | 704/257 |
| 2011/0134321 A1* | 6/2011 | Berry et al. | 348/464 |
| 2012/0075490 A1* | 3/2012 | Tsai | G06Q 30/0241 348/222.1 |
| 2012/0078691 A1* | 3/2012 | Tsai | G06Q 30/0241 705/14.4 |
| 2012/0078712 A1* | 3/2012 | Fontana | G06Q 30/0251 705/14.49 |
| 2012/0078899 A1* | 3/2012 | Fontana | G06F 17/3079 707/736 |
| 2012/0079380 A1* | 3/2012 | Tsai | G06F 17/30817 715/716 |

* cited by examiner

| Event Data |
| 628 |

| Content ID | Timeline | Duration | Event | Target | Function |
|---|---|---|---|---|---|
| . . . | | | | | |

FIG. 7A

| Text Index |
| 630 |

| Content ID | Transcription Text | Start Time | End Time | Text |
|---|---|---|---|---|
| . . . | | | | |

FIG. 7B

| Content |
| 632 |

| Content ID | Content |
|---|---|
| . . . | |

FIG. 7C

| Video Metadata |
| 634a |

| Customer ID | Content ID | Description | Runtime | Size | OriginalAttrib |
|---|---|---|---|---|---|
| . . . | | | | | |

FIG. 7D

| Video Metadata – Objects of Interest |
| 634b |
| Content ID | OISeq | Timeline | Duration | Position | Size | Description | GPS |
| . . . |

FIG. 7E

| Position Data |
| 636 |
| Identification | Latitude | Longitude | Inclination | Direction |
| . . . |

FIG. 7F

| Content Consumer Account Data |
| 702 |
| Customer ID | Address | Phone | Email | Account History | Credentials |
| . . . |

FIG. 7G

| Session Data |
| 704 |
| Session | Content ID | Consumer Location | Consumer | Address |
| . . . |

FIG. 7H

| Keyword Data |
| --- |
| 706 |
| Content ID  Keyword |

FIG. 7I

| Administrative Data |
| --- |
| 708 |
| Customer ID  Name  Address  Phone  Email  Credentials  Preferences |

FIG. 7J

| Analytics Data |
| --- |
| 712 |
| Content ID  Session ID  Action  Timeline  Object ID  Location |

FIG. 7K

Analytics Data - Detailed
714

Content ID    Viewer ID    Views    Click-Through    Completed Play    Time
Viewed    Mute/Unmute    Collapse/Expand    Pause    Resume    Rewind
Accept Invite    Minimize    Close    Overlay View Duration    Search

FIG. 7L

Advertisement Data
716

| Advertiser ID | Advertisement Definition | Associated Topic/Keyword/Content |
|---|---|---|
| | ... | |

FIG. 7M

AMALGAMATING MULTIMEDIA TRANSCRIPTS FOR CLOSED CAPTIONING FROM A PLURALITY OF TEXT TO SPEECH CONVERSIONS

TECHNICAL FIELD

The present disclosure relates to delivery of multimedia content. In particular, the present disclosure relates to systems and methods for converting speech in multimedia content to text.

BACKGROUND

Increasingly, online delivery of content has shifted to include more multimedia content integrated with or in place of static content. This online multimedia content can include, for example, audio and video content provided by a content provider, whether an individual or a business/organization.

To make content available for consumption, a content provider typically provides a website or portal through which the content can be accessed by a content consumer. To do so, the content provider may then edit and upload the content to a service or may host the content itself; however, typically a content consumer will access that content via a website, rendering the specific methods and devices used to store and provide the content obscured to the content consumer.

There are a number of drawbacks to this arrangement for both content consumers and content providers. First, it can be difficult for consumers of multimedia content to locate and use relevant content, for a number of reasons. For example, it is currently difficult to locate particular online hosted multimedia content unless the creator of that content includes relevant identifying information into the title, description, or other information associated with the piece of multimedia content. Even in such cases, that piece of multimedia content is described as a whole, rather than including a description of the various people, places, or discussions present in various subsections of the content. Furthermore, if information were to be added to the content, or if the content were to be subdivided into sections of interest for the consumer, that content would need to be reprocessed either beforehand or during the request for such content. Such content reprocessing would require use of substantial computing resources.

Second, and with respect to content providers, multimedia content is typically provided as a single item. This means that the content is uploaded as a whole and streamed, from beginning to end, to a content consumer when requested, even when the content consumer only wishes to watch a particular portion of the content. Content providers currently do not have an easy way to identify objects appearing in the content (e.g., people, places, and things), such that a user can individually search for and identify those objects, while concurrently allowing users to view/listen to the continuous whole piece of content. Furthermore, content providers cannot easily integrate or link other services to the multimedia content to a user, and cannot easily track usage of multimedia content or relationships between that content and other web-based information sought by a content consumer.

For these and other reasons, improvements are desirable.

SUMMARY

In accordance with the following, the above and other problems are addressed by the following:

In a first aspect, a method of converting speech to text includes analyzing multimedia content to determine the presence of closed captioning data. The method further includes, upon detecting closed captioning data, indexing the closed captioning data as associated with the multimedia content. The method further includes, upon failure to detect closed captioning data in the multimedia content, extracting audio data from multimedia content, the audio data including speech data, performing a plurality of speech to text conversions on the speech data to create a plurality of transcripts of the speech data, selecting text from one or more of the plurality of transcripts to form an amalgamated transcript, and indexing the amalgamated transcript as associated with the multimedia content.

In a second aspect, a system for converting speech to text is disclosed. The system includes one or more computing systems each including a programmable circuit and a memory. The one or more computing systems are configured to execute program instructions, which, when executed, cause the one or more computing systems to analyze multimedia content to determine the presence of closed captioning data, and upon detecting closed captioning data, index the closed captioning data as associated with the multimedia content. The one or more computing systems are also configured to execute program instructions, which, when executed, cause the one or more computing systems to, upon failure to detect closed captioning data in the multimedia content, extract audio data from multimedia content, the audio data including speech data, perform a plurality of speech to text conversions on the speech data to create a plurality of transcripts of the speech data, select text from one or more of the plurality of transcripts to form an amalgamated transcript, and index the amalgamated transcript as associated with the multimedia content.

In a third aspect, a method of converting speech to text is disclosed. The method includes training one or more speech to text programs using a context-sensitive speech to text dictionary selected according to the subject matter of the multimedia content. The method further includes analyzing the extracted speech data to determine the presence of closed captioning data. The method includes, upon detecting closed captioning data, indexing the closed captioning data as associated with the multimedia content. The method further includes, upon failure to detect closed captioning data in the speech data, extracting audio data from multimedia content, the audio data including speech data, performing a plurality of speech to text conversions on the speech data using the one or more speech to text programs to create a plurality of transcripts of the speech data, the speech to text programs each associated with different software vendors, selecting text from one or more of the plurality of transcripts to form an amalgamated transcript, and indexing the amalgamated transcript as associated with the multimedia content by storing metadata associating text in the amalgamated transcript to timestamps associated with the multimedia content.

BRIEF DESCRIPTION OF THE DRAWINGS

FIG. 7A is a data diagram of example event metadata useable to define event enhancements to multimedia content, according to a possible embodiment of the present disclosure;

FIG. 7B is a data diagram of an example text index data useable to define search and transcription enhancements to multimedia content, according to a possible embodiment of the present disclosure;

FIG. 7C is a data diagram of an example content container, according to a possible embodiment of the present disclosure;

FIG. 7D is a data diagram of example video metadata useable to define enhancements to multimedia content, according to a possible embodiment of the present disclosure;

FIG. 7E is a data diagram of further example video metadata useable to define enhancements to multimedia content, according to a possible embodiment of the present disclosure;

FIG. 7F is a data diagram of example location-based metadata useable to define location-based enhancements to multimedia content, according to a possible embodiment of the present disclosure;

FIG. 7G is a data diagram of example content consumer data useable to define enhancements to multimedia content, according to a possible embodiment of the present disclosure;

FIG. 7H is a data diagram of example session data useable to provide track use of multimedia content, according to a possible embodiment of the present disclosure;

FIG. 7I is a data diagram of example keyword data useable to provide search enhancements to multimedia content, according to a possible embodiment of the present disclosure;

FIG. 7J is a data diagram of example administrative metadata useable in connection with the multimedia content, according to a possible embodiment of the present disclosure;

FIG. 7K is a data diagram of example analytics metadata useable in connection with multimedia content, according to a possible embodiment of the present disclosure;

FIG. 7L is a data diagram of further example analytics metadata useable in connection with multimedia content, according to a possible embodiment of the present disclosure;

FIG. 7M is a data diagram of example advertisement metadata useable to associate advertisements with multimedia content, according to a possible embodiment of the present disclosure;

DETAILED DESCRIPTION

Figure 1:
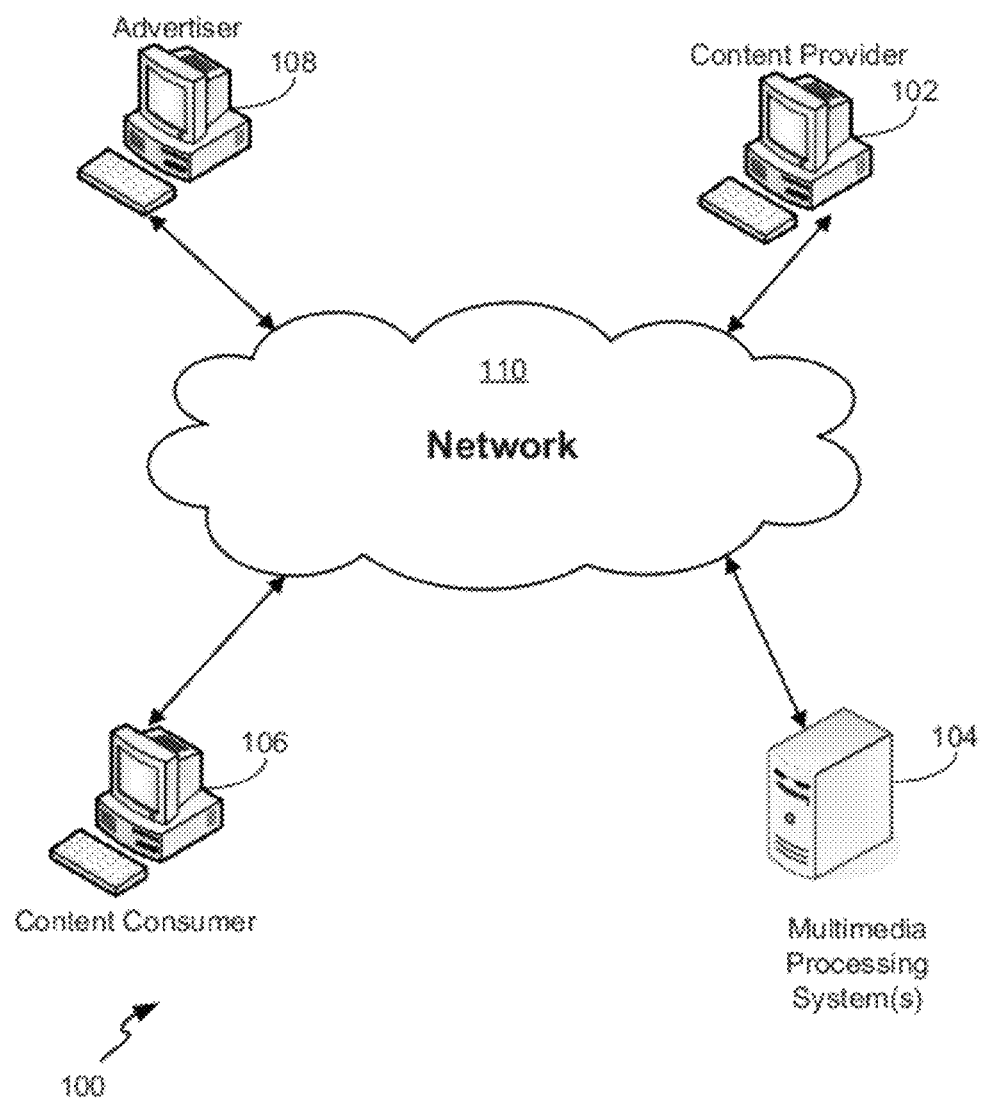
FIG. 1 is a diagram of a network in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to methods and systems for receipt, processing, and delivery of multimedia content, as well as enrichment of multimedia content for enhanced search and delivery. The methods and systems described herein can be delivered, in certain embodiments, via a "cloud" based service in which one or more distributed computing systems cooperate to perform back-end processing of multimedia content in a manner that is opaque (e.g., the process is hidden or not disclosed) to a provider of the content and a requester of the content. The methods and systems described herein provide search and playback enhancements to multimedia content, in part, by processing the content in a back-end server environment to generate metadata describing the content. By integrating enhancements using metadata linked to the content, the enhancements can be synchronously displayed or controlled during playback of the multimedia content, and can be customized to the particular items within the content as well as the individuals viewing the content. Additionally, by tracking content and use of that content by content consumers, the enhancements associated with the content can be customized for each particular content consumer's interests, preferences, and history. The multimedia content, once processed, need not be reprocessed for each replay or each content consumer, but can be combined with various different enhancements to provide a different multimedia experience to different content consumers.

In the context of the present disclosure, multimedia content can include any type of content containing, for example, one or more of images, video, audio, or a combination thereof. In certain embodiments, the multimedia content is audiovisual content capable of being streamed to a user. In the context of the present disclosure, a robust example of multimedia content is used in which video and audio information are included; however, other types of content can be multimedia content as well, consistent with the present disclosure. The enhanced multimedia content described in the present disclosure generally relates to multimedia content with associated interactive features, for example hyperlinks to content having related or similar subject matter, identification of objects or conditions apparent in the multimedia content, associated transcript information linked to the multimedia content for keyword searching, or other features as described herein.

In the present disclosure, various components useable to accomplish enhancements to multimedia content are described, followed by various methods and systems for processing of the multimedia content and playback of the multimedia content and associated interactive features.

I. Infrastructure and Example Components for Systems for Processing and Management of Multimedia Content Referring now to FIGS. 1-5, various schematic diagrams are provided illustrating possible network and computing system configurations useable to implement aspects of the present disclosure. FIG. 1 is a generalized diagram of a network 100 in which aspects of the multimedia content processing and delivery systems of the present disclosure is provided. The network 100 illustrates the various entities involved in processing and delivery of multimedia content, including a content provider 102, a multimedia processing system 104, a content consumer 106, and an advertiser 108. Entities 102-108 are interconnected at a network 110, which, in various embodiments, can correspond to the Internet or some other wide-area network system.

The content provider 102 corresponds to an owner of the multimedia content, and in certain embodiments of the present disclosure, will correspond to the entity from which multimedia content is requested, searched, and streamed. The multimedia processing system 104, although represented by a single computing system, is in preferred embodiments a plurality of distributed computing systems, the operation of which is disclosed in further detail below. In general, the multimedia processing system 104 is configured to receive multimedia content from a content provider, process the multimedia content to generate metadata, and optionally to return the multimedia content to the content provider in a format capable of linking to external metadata.

As explained in further detail below, in certain embodiments, the multimedia processing system 104 is configured to deliver the multimedia content back to the content provider in a Flash container, as defined by Adobe Systems Inc. of San Jose, Calif. In certain alternative embodiments, the multimedia processing system 104 is configured to store the received multimedia content, so that the system 104 can respond to requests for multimedia content by providing both the content and associated metadata.

The content consumer 106 represents one or more entities expected to transmit requests to the content provider 102 for multimedia content. The requests from the content consumer 106 typically take one of a number of forms, such as a search request, a request for playback of content, or other requests related to the multimedia content, such as relating to the particular subjects or objects of interest displayed in the content. Other requests can be transmitted from a content consumer as well. The advertiser 108 can provide one or more advertisements for use within a website hosted by a content provider or other third party.

Figure 2:
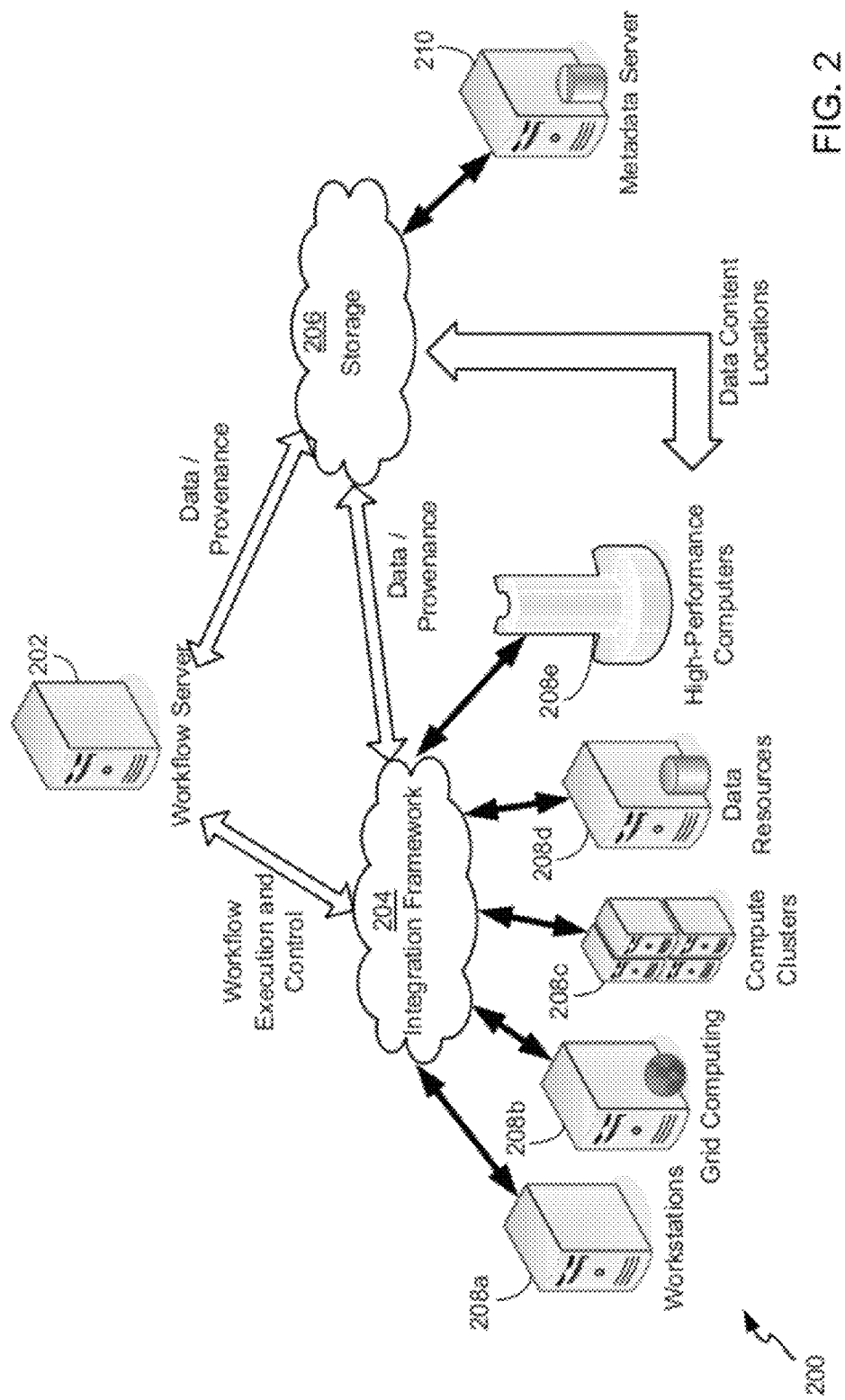
FIG. 2 is a diagram of an example network for processing and distribution of multimedia content, according to a possible embodiment of the present disclosure.

Now referring to FIG. 2, a diagram of an example network 200 for processing and distribution of multimedia content is shown, according to a possible embodiment of the present disclosure. The network 200 can, in certain embodiments, correspond to an architecture underlying the multimedia processing system 104 of FIG. 1, for example in a cloud-based or other distributed computing environment. The network 200 includes, in the embodiment shown, a workflow server 202 interconnected to an integration framework 204 and a storage network 206. The integration framework 204 provides interconnectivity and data sharing among a plurality of computing systems, such that the computing systems can share workloads, messages, and other tasks. The integration framework 204 can be connected to any of a plurality of differing types of computing systems 208 capable of sharing workloads; in the embodiment shown, various shared computing systems are illustrated including workstations 208a, grid computing systems 208b, compute clusters 208c, data resources 208d, and one or more high performance computing systems 208e. Other systems beyond those shown can be communicatively connected via the integration framework 204 as well.

The storage network 206 provides an addressable location for storage of data generated at the integration framework 204, and can include one or more data servers, illustrated as metadata server 210. The storage network 206 can also be connected, in certain embodiments, to one or more of the computing systems 208, for example if any content is stored in or being processed by a system communicatively interconnected to the integration framework 204.

The workflow server 202 receives inbound data processing requests, for example from a content provider (as further discussed below) and distributes one or more portions of jobs associated with each data processing request to the integration framework 204 and the storage network 206. The manner in which this data transfer occurs can vary according to the particular implementation of the distributed computing networks included in the network 200. In certain embodiments, the overall network 200 is administered using a middleware software package such as the MeDICi middleware software package developed by the Department of Energy's (DOE) Pacific Northwest National Laboratory (PNNL) in Richland, Wash. As further described below on connection with FIG. 4, the middleware software implemented in the present disclosure allows creation of pipelined data processing systems within a distributed computing environment, allowing computationally intensive jobs (e.g., video and audio content processing) to be distributed across a number of computing systems. In certain embodiments, various components from such a middleware layer can be included, such as an integration framework for messaging among computing systems, a provenance framework for capturing metadata used for reconstruction of result sets, and a workflow framework for defining tools associated with desired results (in the present disclosure, relating to multimedia content processing and metadata generation). Other software packages are useable as well, and other aspects of the MeDICi middleware software package could also be used.

Figure 3:
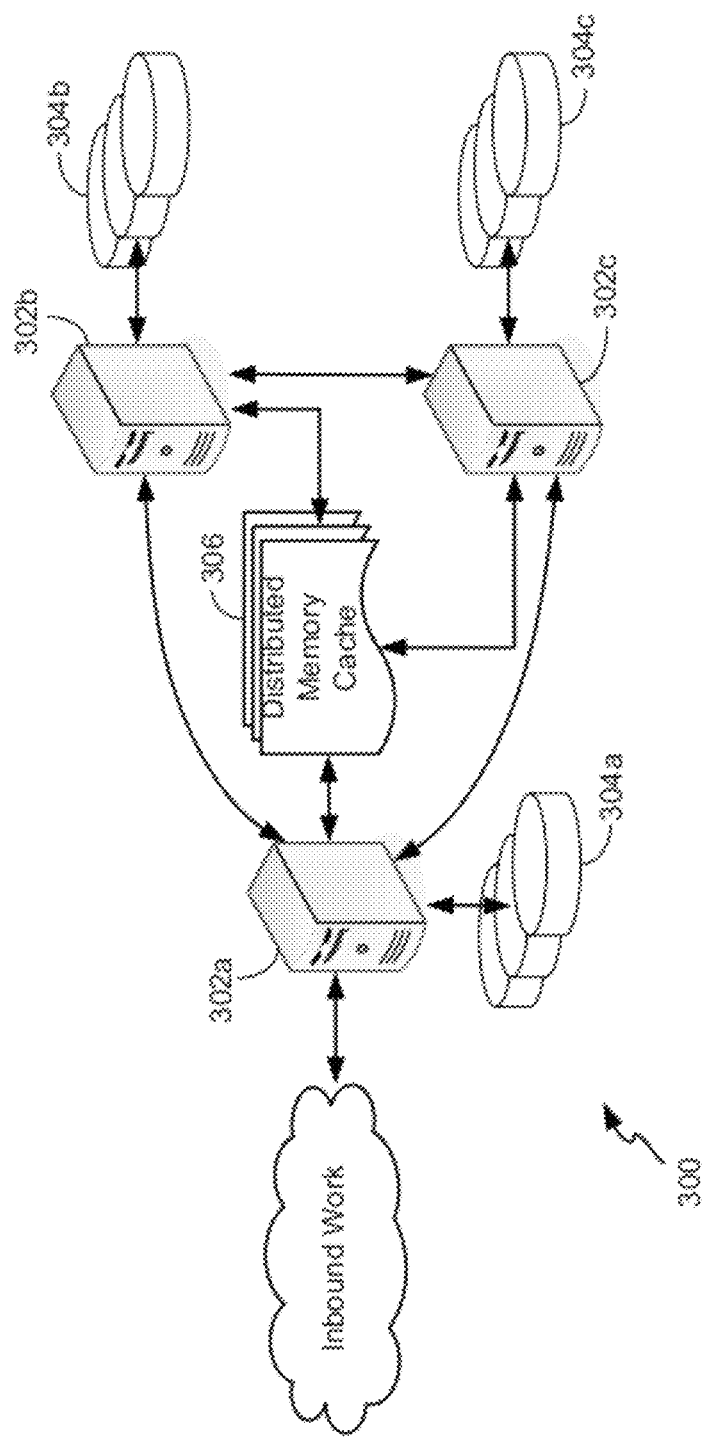
FIG. 3 is a diagram illustrating an example distributed computing network in which aspects of the present disclosure can be implemented.

FIG. 3 is a diagram illustrating an example distributed computing network 300 in which aspects of the present disclosure can be implemented. The network 300 is configured to process the multimedia content received by the systems and methods of the present disclosure, and in certain embodiments also handles metadata and analytics read/store requests. For example, the network 300 can represent a portion of the network 200 of FIG. 2, such as the integration framework 204, or grid computing systems 208b. Other arrangements are possible as well.

In the embodiment shown, the distributed computing network 300 includes a plurality of computing systems, illustrated as servers 302a-c. The servers 302a-c are communicatively interconnected, and each includes a corresponding data storage system 304a-c. The servers 302a-c share a distributed memory cache 306, and are each capable of accessing a shared cache of memory that is not residing in any of data storage systems 304a-c. The servers 302a-c are interfaced to inbound work, such as from a scheduler system (as described in further detail in connection with FIG. 4, below) for coordination and communication of data for processing.

In certain embodiments, the servers 302a-c are specifically designed according to the application the network 300 is intended to support; for example in the case where multimedia data is to be processed using the computing capabilities within network 300, one or more of the servers 302a-c can include specific graphical processing units for processing lower level video, image or audio algorithms. Other specific capabilities can be included into the servers 302a-c as well. The servers 302a-c are configured to share processing jobs, such that tasks can be performed by one or more of the computing systems, or separated and performed across multiple computing systems in parallel.

In certain embodiments, the network 300 can be implemented using the Apache Hadoop software for management and administration of a computational grid. Various builds of this software are available; in an example embodiment, the Hadoop software provided by Cloudera, Inc. of Palo Alto, Calif. can be used.

Referring to FIG. 3 generally, in the various embodiments of the present disclosure, the servers 302a-c can correspond to any of the various computing systems 208 of FIG. 2, in that any of those computing systems can perform all or a portion of a processing job as defined by a scheduling algorithm, allowing multimedia content to be processed efficiently when necessary. As previously discussed, although some time savings may be accomplished by distributing processing of multimedia content across multiple computing systems, in certain embodiments, an advantage of the present disclosure is initial processing of the multimedia content using the techniques described herein to generate a set of metadata useable by one or more users, such that a customized set of metadata (and attendant interactive features) can be associated with the content for each content consumer.

Figure 4:
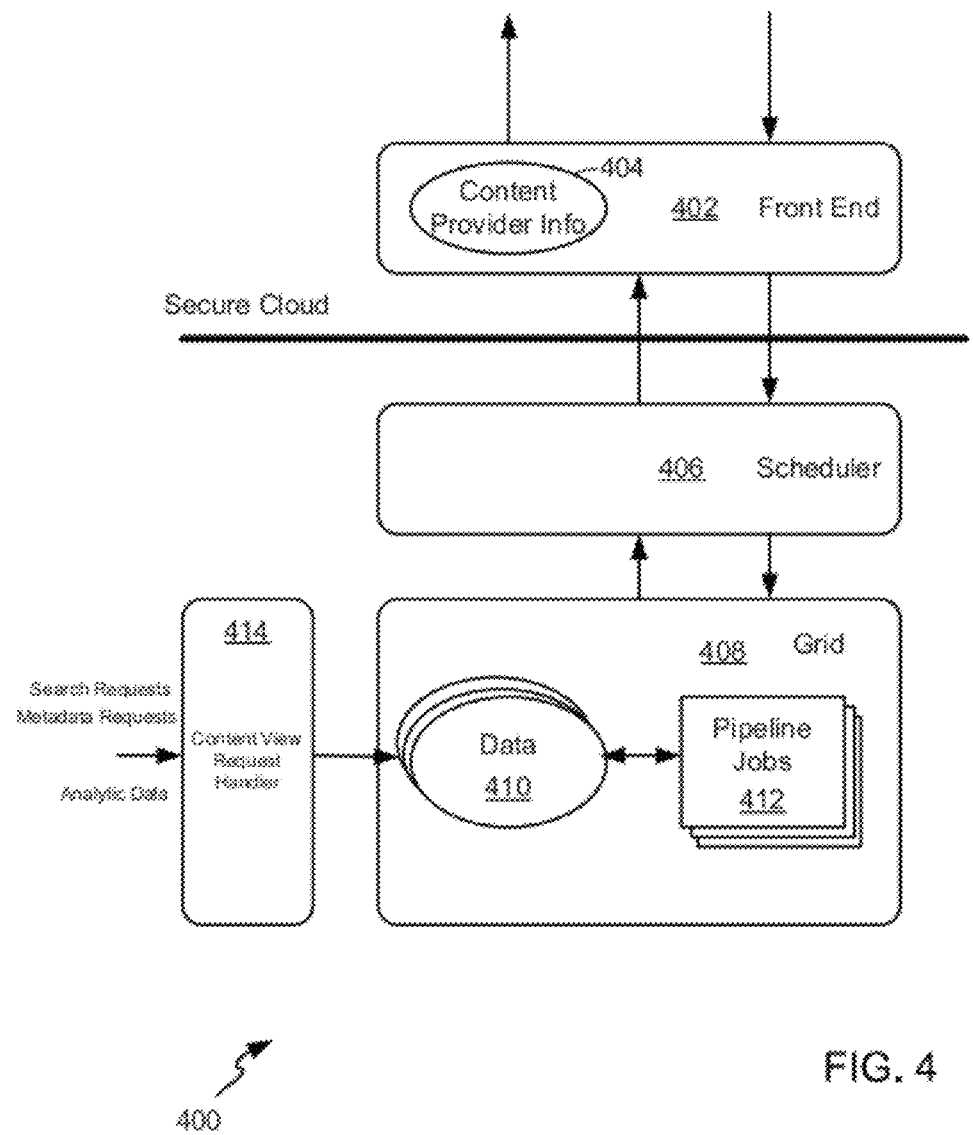
FIG. 4 is a logical block diagram of components of a multimedia content processing and distribution system, according to a possible embodiment of the present disclosure.

FIG. 4 is a logical block diagram of components of a multimedia content processing and distribution system 400, according to a possible embodiment of the present disclosure. The system 400 illustrates components for access by a content provider to upload content to a multimedia processing system, and for handling search and content request messages received from content consumers. The system 400 can be implemented, for example, at a multimedia processing system, such as system 104 of FIG. 1.

In the embodiment shown, the system 400 includes a frontend 402 addressable by content providers, and from which content providers can access tools for upload, processing, and management of multimedia content. In certain embodiments, frontend 402 will physically reside within a cloud or distributed computing arrangement, and will transmit processing jobs to be assigned to the computational and data grid. The frontend 402 also provides user management, billing and security functions. Content providers can access the frontend by any of a number of methods. Example input options for submitting multimedia content to the frontend include use of TCP/IP connections and a dedicated daemon; use of a web service; use of a JSON data connection; or use of a STOMP (ActiveMQ/JMS) connection. Other input options are possible as well. In certain embodiments, the frontend can be implemented using Kaltura, a video processing platform available from Kaltura, Inc. of New York, N.Y.

In use, when a content provider wishes to connect to the frontend 402, a number of data packets can be exchanged. Optionally, all or a portion of these data packets can be secured using SSL/TLS encryption techniques. Additionally, when content is transmitted to the frontend 402 from the content provider, the frontend 402 can assign the content an identifier, for example using a format <host>-<timestamp>-<sequence>. In such an arrangement, the <host> element could be a host number which might be useful for determining the host that initially processed the request, and may hold some metadata relating to the multimedia content. The <timestamp> could correspond to the current system timestamp. The <sequence> could correspond to a rolling sequence number for the initial processing host. Alternatively, a UID or GUID can be used. These operations associated with each content provider can be, for example, instructions provided to a video or other multimedia-editing web service, for example to define specific elements of multimedia content, such as objects of interest appearing in the content, or to segment, edit, and reprocess the content.

In certain embodiments, the frontend 402 also provides notification services to a content provider. For example, a content provider may wish to be notified when the content they submitted has completed processing and is available for review, the frontend can be configured to deliver an email or other confirmation message to the content provider. Alternatively, a URL-based notification scheme could be used.

In certain additional embodiments, the frontend 402 includes information about various content providers, and performs credentialing checks prior to allowing the content provider access. Various credentialing processes could be used, and are compared to information 404 stored at the frontend to identify the user associated with the content provider, and associate that user with the multimedia content submitted from the content provider. In certain embodiments, the information 404 can include a customer identifier, customer type (e.g., content provider or content consumer), name, contact information (physical and electronic addresses), password information, as well as various preference information associated with the content provider. Other information can be stored in the information 404 as well.

In the embodiment shown, the system 400 also includes a scheduler 406 interfaced to the frontend 402, and providing coordinated communicative access to a computing grid 408. The scheduler 406 in general receives tasks from the frontend 402 as defined by content providers, for example indicating that multimedia content should be processed to generate one or more objects of interest, to create a transcript of the multimedia content, or other typically computationally-intensive functions. The scheduler 406 receives and routes the content and processing requests to the desired computing systems within the grid 408; the scheduler generally provides the ability to equally distribute resources to all jobs that are running at once, with the goal of providing capacity to production jobs and acceptable response time to interactive jobs while allocating resources fairly among content providers accessing the system. The scheduler 406 can take any of a number of forms. In certain embodiments, the scheduler 406 can be modeled on the Hadoop Fair Scheduler, developed by Facebook, Inc. of Palo Alto, Calif. In alternative embodiments, the scheduler 406 can be modeled on the Capacity Scheduler developed by Yahoo, Inc. of Sunnyvale, Calif.

In embodiments where the scheduler 406 represents a Fair Scheduler, it will use task slots to distribute jobs within the cluster. When more than one job is submitted, task slots that are freed are assigned to the new jobs, so that each job is assigned approximately the same amount of CPU time in the grid 408. Optionally, in such embodiments the scheduler 406 can be configured to share a cluster among a number of different users and set job priorities—for example, the priorities can be used as weights to determine the fraction of total compute time that each job should be assigned.

In certain embodiments, the scheduler 406 can be configured to organize jobs into pools, such that resources are shared fairly between pools. By default, there is a separate pool for each content provider, so that each content provider gets the same share of the cluster no matter how many jobs they have submitted. Optionally, the scheduler 406 can allow assignment of a guaranteed minimum number of shares to pools, which ensures that certain users, groups or production applications always are assigned sufficient resources. When a pool contains jobs, it will get at least its minimum share, but in the event that the pool does not need its full guaranteed share, the excess will be split between other running jobs. In certain embodiments, the scheduler 406 also gives us the option to limit the number of running jobs per user and per pool. Limiting the jobs does not cause any subsequently submitted jobs to fail, only to wait in the scheduler's queue until some of the user's earlier jobs finish.

In alternative embodiments where the scheduler 406 represents a Capacity Scheduler, a number of named queues can be defined, each with a configurable number of "map and reduce" slots. In this embodiment, the scheduler 406 assigns each queue its capacity when it contains jobs, and shares any unused capacity among the queues. Within each queue, first-in, first-out (FIFO) scheduling with priorities is preferably used. During use, the scheduler 406 can be configured to pick a queue whose resources were temporarily being used by some other queue and now needs access to those resources. If no such queue is found, the scheduler 406 can select a queue which has most free space (based on a ratio of number of running slots to guaranteed capacity). Once a queue is selected, the scheduler 406 can pick a job in the queue. In this embodiment, the scheduler 406 can be configured to sort and assign jobs based on the time the job is submitted and the priority level set for that job.

In the various embodiments, the scheduler 406 can include a web interface for administration as well. Additionally, other work managers and load 20 balancing software can be used as well, such as the Commonj workflow manager available in Java, or the Gearman workflow manager.

As previously described, the computing grid 408 can include any of a number of computing systems communicatively arranged to share tasks, as defined by the scheduler 406. In certain embodiments, the computing grid 408, as well as the frontend 402 and scheduler 406 can be implemented in a distributed computing network, such as network 300 of FIG. 3. The computing grid 408 includes data storage 410, as well as processing units configured to manage jobs assigned from the scheduler (illustrated as pipeline jobs 412). The pipeline jobs 412 generally represent discrete work tasks assignable to one or more computing systems as received from content providers, to provide processing of content and generation of metadata. The data storage 410 can be configured to store any of a number of different types of data, including the received multimedia content and data associated therewith. In certain embodiments, the data storage 410 includes a set of metadata associated with each piece of multimedia content processed by the computing grid 408, for example as generated by processing the multimedia content. The data storage 410 can include various information about the multimedia content (as further described in FIG. 5, below), for storage and access when requests for that metadata are received. The data storage 410 can also store analytics information regarding access requests received related to the multimedia content, such as information about the number of requests for the content that are received, a number of advertisements displayed in association with the content, or other settings.

In certain embodiments, the computing grid 408 and data storage 410 does not store the multimedia content itself once that content is processed. Rather, in such embodiments, the content can be transformed to a format useable in association with metadata generated by the computing grid, and returned to the content provider.

In certain further embodiments, the frontend 402, scheduler 406 and grid 408 cooperate to allow partial processing of multimedia content, for example in a circumstance where a portion of the multimedia content has been previously processed (e.g., where metadata has been generated, but no transcript has yet been generated, or where metadata is to be modified with one or more additional objects of interest, as described below). Other functionalities could be included in the system 400 as well.

In the embodiment shown, a request handler 414 can be interfaced to the grid 408, and is configured to receive requests for data stored in the grid. For example the request handler 414 can handle requests for metadata related to multimedia content, whether from a content provider (in the case the content provider is hosting its own content), or from a content consumer (in which case the metadata and converted multimedia content is delivered from the grid 408). The request handler 414 can also receive search queries relating to the metadata stored in the grid 408, for example from content consumers seeking a particular piece of multimedia content, or seeking a list of pieces of multimedia content in which the search criteria is found.

In various embodiments of the present disclosure, the data exchanged between the frontend 402 and a content provider, or between the request handler 414 and a content provider or consumer, is initiated from the content provider or consumer. In certain embodiments, the content provider or consumer is provided a plugin or other software component installed that is capable of communication with the frontend 402. Data exchanged can include, both top level metadata describing the content and other types of metadata describing enhancements to the content. Top level metadata associated with the content can include, for example, an identifier of the content or its provider; a description of the content as a whole; the runtime of the content; the size of the content file; and other assorted data. Metadata associated with content enhancements can include for example, the content provider's identifier, the resource used, the name of the multimedia processing project, an identifier for the multimedia content, the size or type of the content, the size or number of objects of interest included in the content; the size or number of speech to text elements associated with the content, as well as the speech to text elements themselves; any advertisements or promotions to be included alongside the content; and keywords associated with the content. Other information can be included as well, such as the content itself or other services that are to be processed alongside the content. Additional specific information related to speech to text conversions and objects of interest are described in further detail below, and can also form a portion of the data exchanged between the frontend 402 or request handler 414 and a content provider or consumer are described in further detail below.

The request handler 414 can further receive analytics data as well as requests for analytics data, including data relating to playback of the multimedia content. Additional details regarding types of analytics data tracked are provided in connection with FIGS. 6-8, below.

Figure 5:
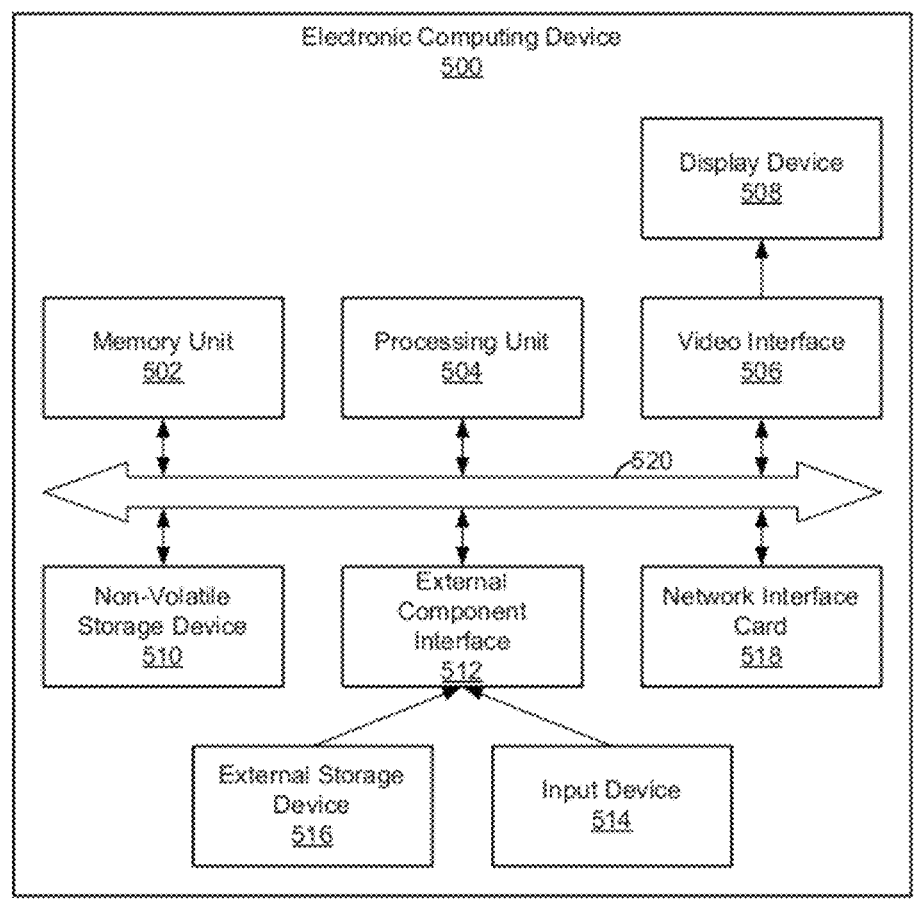
FIG. 5 is a block diagram illustrating example physical components of an electronic computing device useable to implement the various methods and systems described herein.

FIG. 5 is a block diagram illustrating example physical components of an electronic computing device 500, which can be used to execute the various operations described above, and provides an illustration of further details regarding any of the computing systems described above in FIGS. 1-4. A computing device, such as electronic computing device 500, typically includes at least some form of computer-readable media. Computer readable media can be any available media that can be accessed by the electronic computing device 500. By way of example, and not limitation, computer-readable media might comprise computer storage media and communication media.

As illustrated in the example of FIG. 5, electronic computing device 500 comprises a memory unit 502. Memory unit 502 is a computer-readable data storage medium capable of storing data and/or instructions. Memory unit 502 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 500 comprises a processing unit 504. As mentioned above, a processing unit is a set of one or more physical electronic integrated circuits that are capable of executing instructions. In a first example, processing unit 504 may execute software instructions that cause electronic computing device 500 to provide specific functionality. In this first example, processing unit 504 may be implemented as one or more processing cores and/or as one or more separate microprocessors. For instance, in this first example, processing unit 504 may be implemented as one or more Intel Core 2 microprocessors. Processing unit 504 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 504 may be implemented as an ASIC that provides specific functionality. In a third example, processing unit 504 may provide specific functionality by using an ASIC and by executing software instructions.

Electronic computing device 500 also comprises a video interface 506. Video interface 506 enables electronic computing device 500 to output video information to a display device 508. Display device 508 may be a variety of different types of display devices. For instance, display device 508 may be a cathode-ray tube display, an LCD display panel, a plasma screen display panel, a touch-sensitive display panel, a LED array, or another type of display device.

In addition, electronic computing device 500 includes a non-volatile storage device 510. Non-volatile storage device 510 is a computer-readable data storage medium that is capable of storing data and/or instructions. Non-volatile storage device 510 may be a variety of different types of non-volatile storage devices. For example, non-volatile storage device 510 may be one or more hard disk drives, magnetic tape drives, CD-ROM drives, DVD-ROM drives, Blu-Ray disc drives, or other types of non-volatile storage devices.

Electronic computing device 500 also includes an external component interface 512 that enables electronic computing device 500 to communicate with external components. As illustrated in the example of FIG. 5, external component interface 512 enables electronic computing device 500 to communicate with an input device 514 and an external storage device 516. In one implementation of electronic computing device 500, external component interface 512 is a Universal Serial Bus (USB) interface. In other implementations of electronic computing device 500, electronic computing device 500 may include another type of interface that enables electronic computing device 500 to communicate with input devices and/or output devices. For instance, electronic computing device 500 may include a PS/2 interface. Input device 514 may be a variety of different types of devices including, but not limited to, keyboards, mice, trackballs, stylus input devices, touch pads, touch-sensitive display screens, or other types of input devices. External storage device 516 may be a variety of different types of computer-readable data storage media including magnetic tape, flash memory modules, magnetic disk drives, optical disc drives, and other computer-readable data storage media.

In the context of the electronic computing device 500, computer storage media includes volatile and nonvolatile, removable and non-removable media implemented in any method or technology for storage of information such as computer readable instructions, data structures, program modules or other data. Computer storage media includes, but is not limited to, various memory technologies listed above regarding memory unit 502, non-volatile storage device 510, or external storage device 516, as well as other RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the electronic computing device 500.

In addition, electronic computing device 500 includes a network interface card 518 that enables electronic computing device 500 to send data to and receive data from an electronic communication network. Network interface card 518 may be a variety of different types of network interface. For example, network interface card 518 may be an Ethernet interface, a token-ring network interface, a fiber optic network interface, a wireless network interface (e.g., WiFi, WiMax, etc.), or another type of network interface.

Electronic computing device 500 also includes a communications medium 520. Communications medium 520 facilitates communication among the various components of electronic computing device 500. Communications medium 520 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Communication media, such as communications medium 520, typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Electronic computing device 500 includes several computer-readable data storage media (i.e., memory unit 502, non-volatile storage device 510, and external storage device 516). Together, these computer-readable storage media may constitute a single data storage system. As discussed above, a data storage system is a set of one or more computer-readable data storage mediums. This data storage system may store instructions executable by processing unit 504. Activities described in the above description may result from the execution of the instructions stored on this data storage system. Thus, when this description says that a particular logical module performs a particular activity, such a statement may be interpreted to mean that instructions of the logical module, when executed by processing unit 504, cause electronic computing device 500 to perform the activity. In other words, when this description says that a particular logical module performs a particular activity, a reader may interpret such a statement to mean that the instructions configure electronic computing device 500 such that electronic computing device 500 performs the particular activity.

One of ordinary skill in the art will recognize that additional components, peripheral devices, communications interconnections and similar additional functionality may also be included within the electronic computing device 500 without departing from the spirit and scope of the present invention as recited within the attached claims.

II. Applications of Distributed Computing Systems to Multimedia Content

Figure 8:
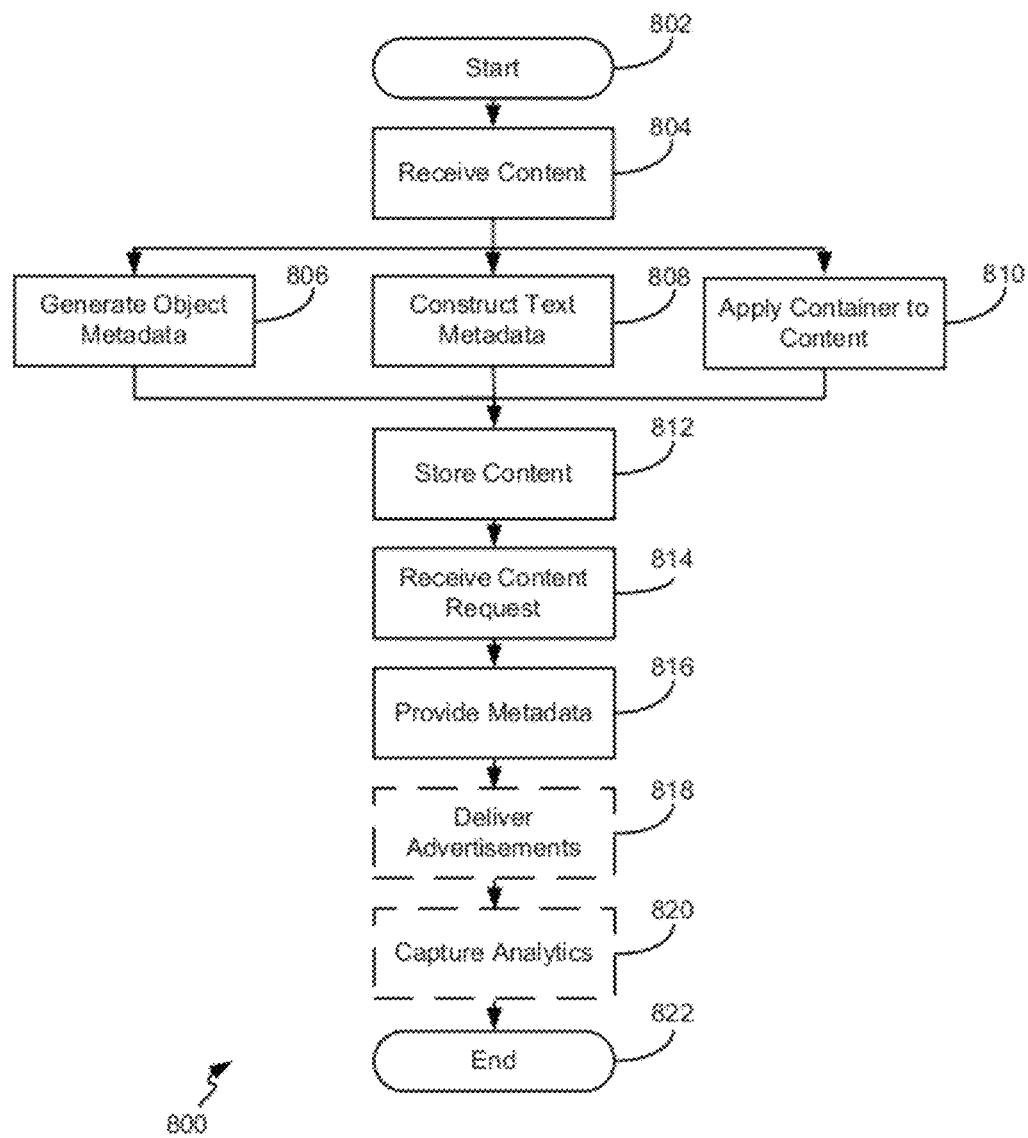
FIG. 8 is a flowchart of methods and systems for processing and delivering multimedia content, according to a possible embodiment of the present disclosure.
Figure 9:
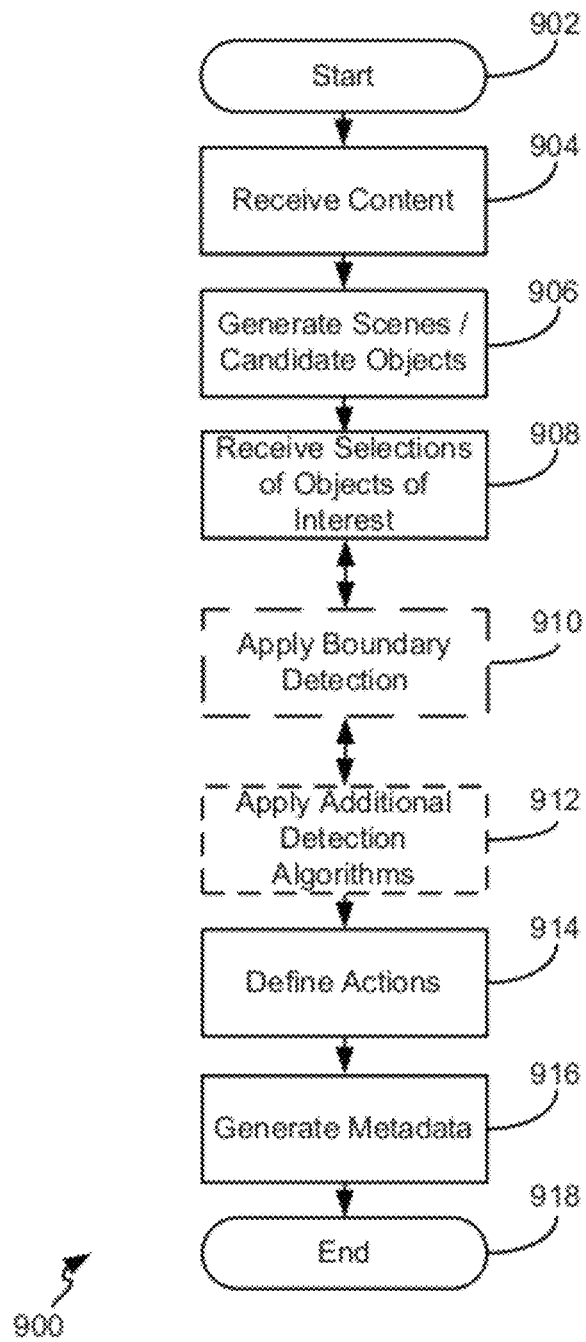
FIG. 9 is a flowchart of methods and systems for detecting objects of interest in multimedia content, according to a possible embodiment of the present disclosure.
Figure 10:
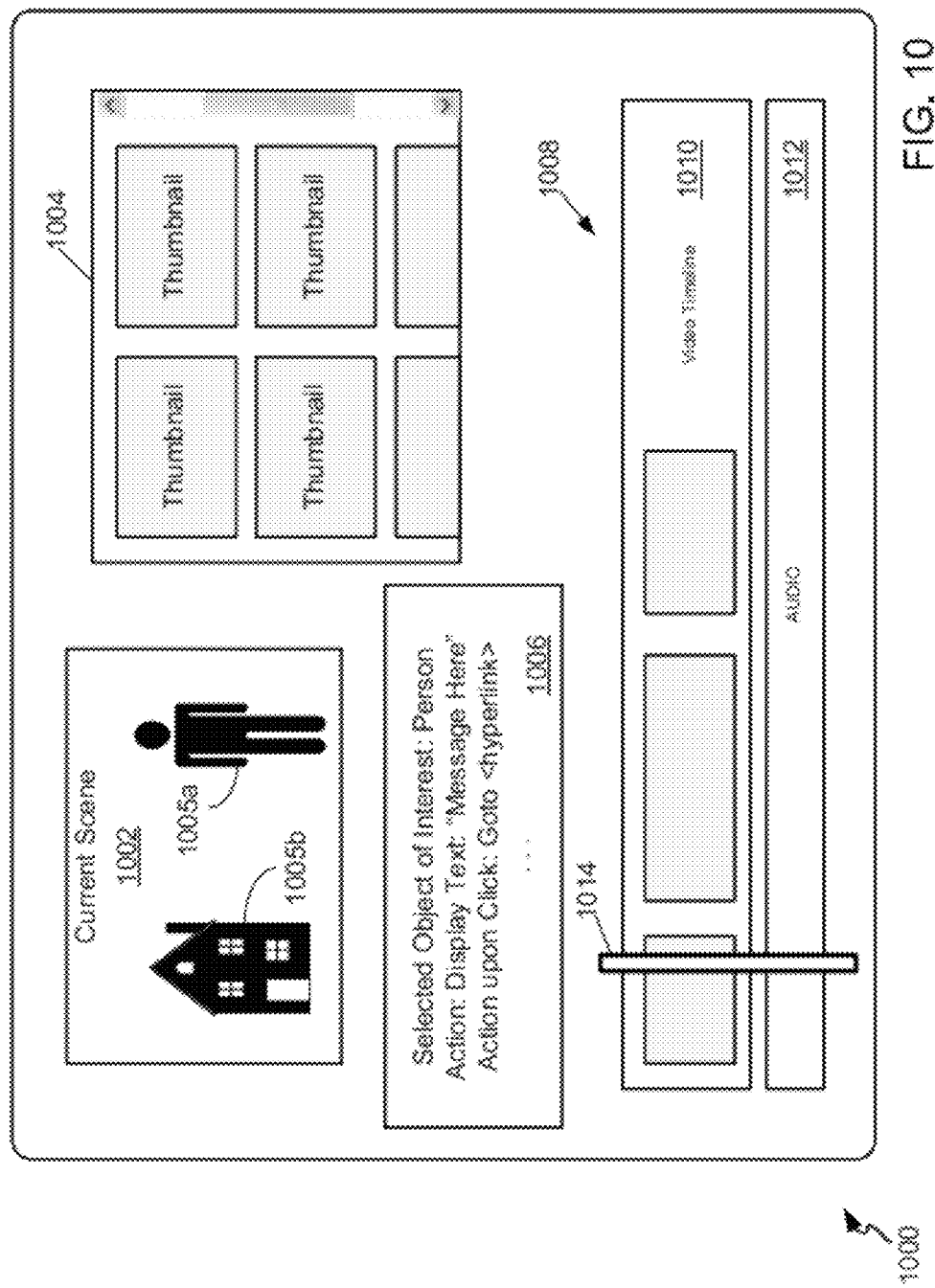
FIG. 10 is an example user interface presented by a multimedia management frontend configured for defining metadata associated with multimedia content, according to a possible embodiment of the present disclosure.
Figure 11:
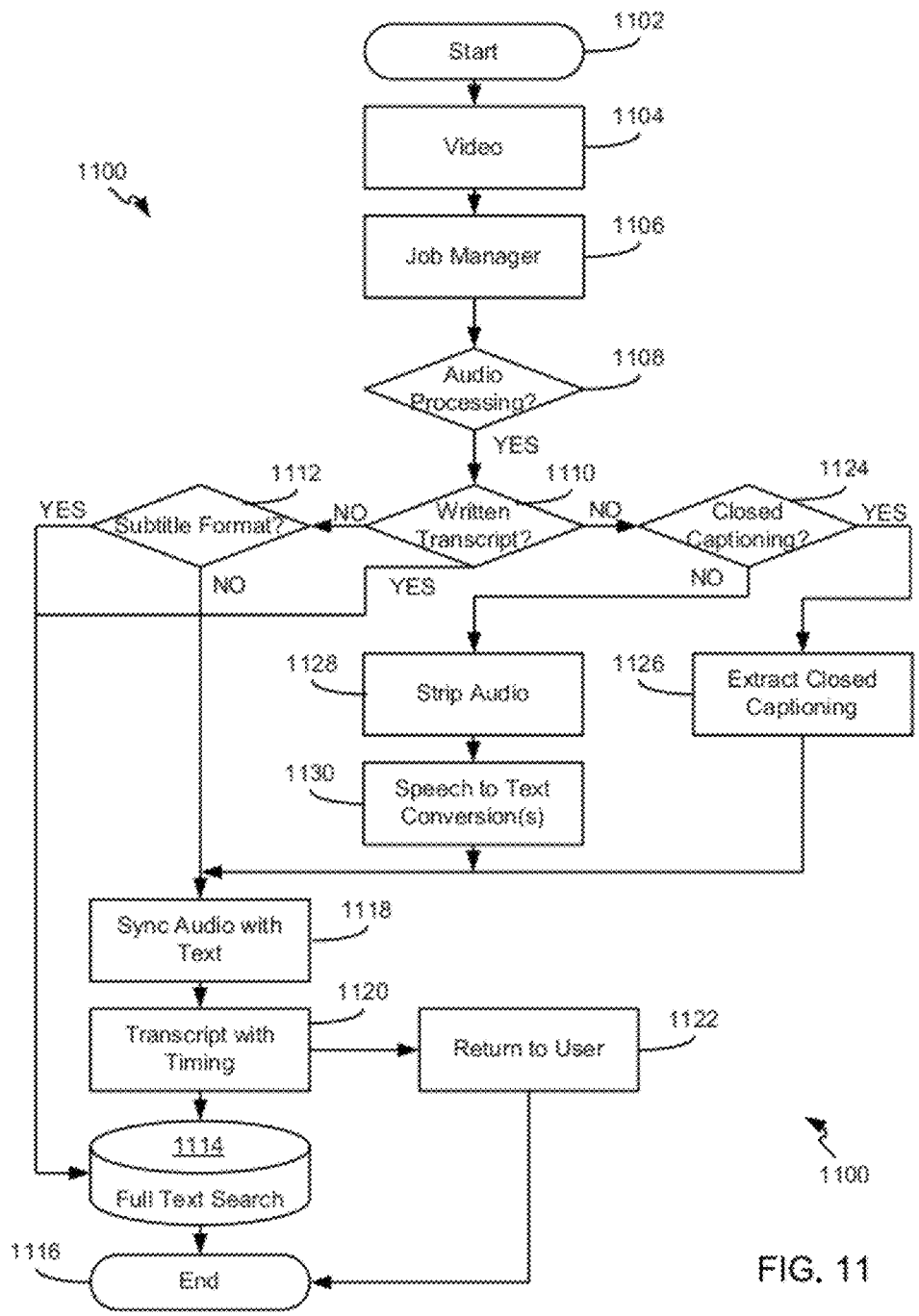
FIG. 11 is a flowchart of methods and systems for converting audio information in multimedia content to text information, according to a possible embodiment of the present disclosure.
Figure 12:
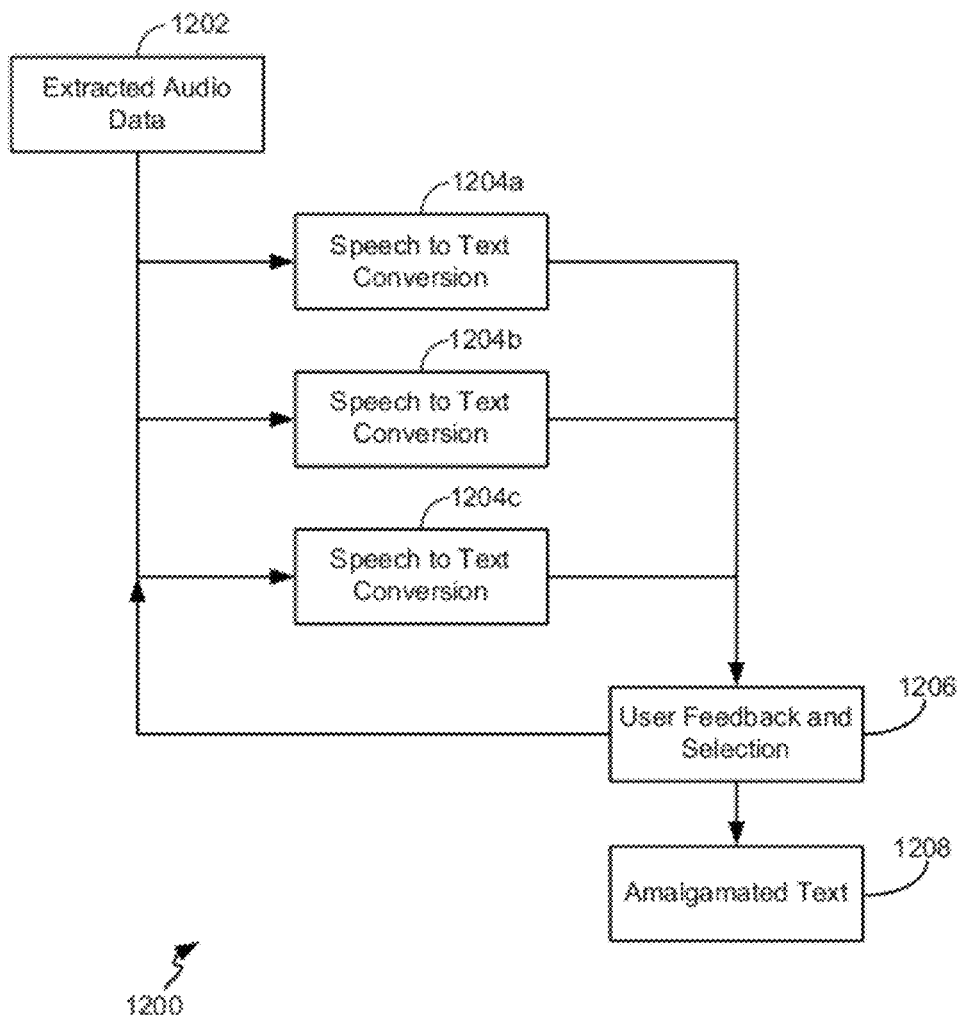
FIG. 12 is a schematic block diagram of a system for performing speech to text conversions, according to a possible embodiment of the present disclosure.
Figure 13:
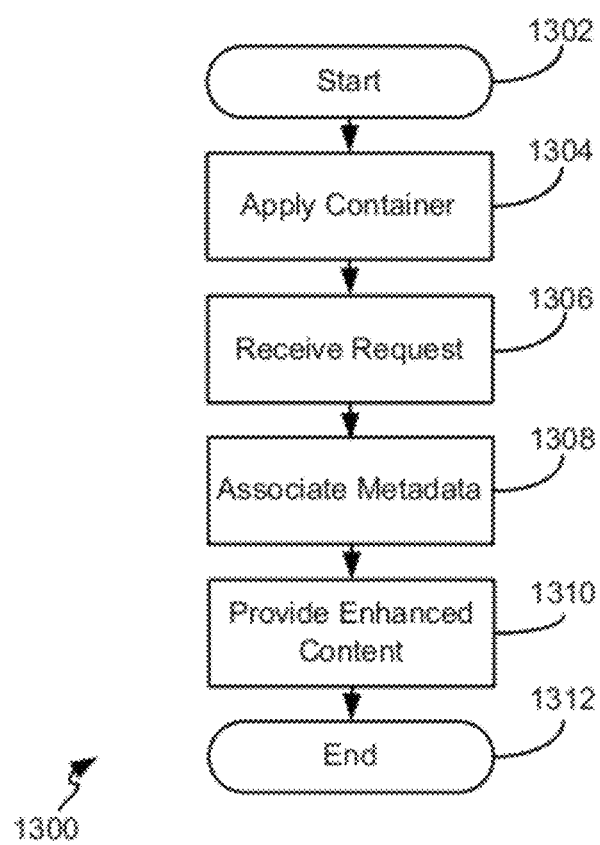
FIG. 13 is a flowchart of methods and systems for providing customized multimedia content to a content consumer, according to a possible embodiment of the present disclosure.
Figure 14:
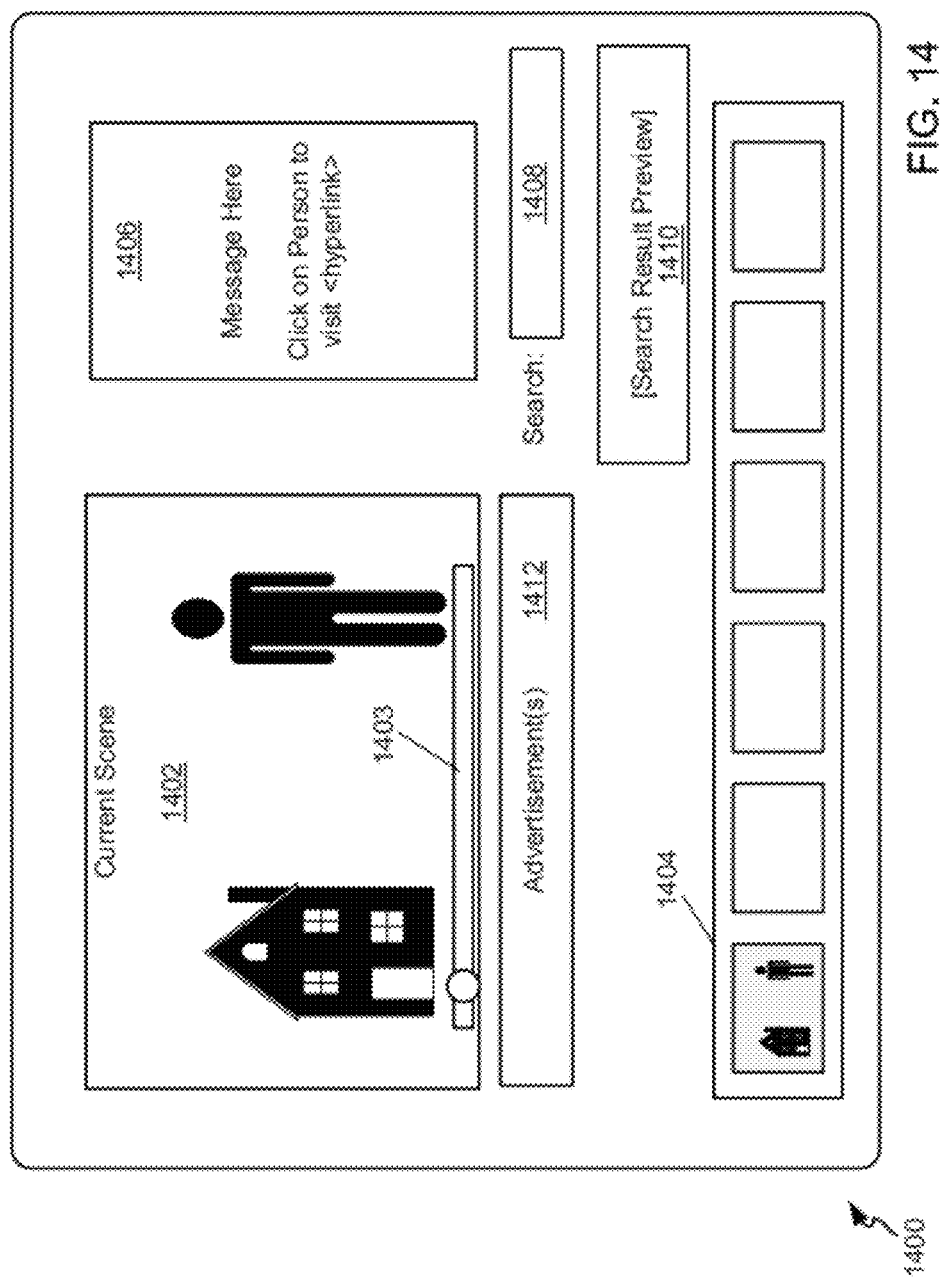
FIG. 14 is an example user interface presented by a multimedia content processing and delivery system, according to a possible embodiment of the present disclosure.
Figure 15:
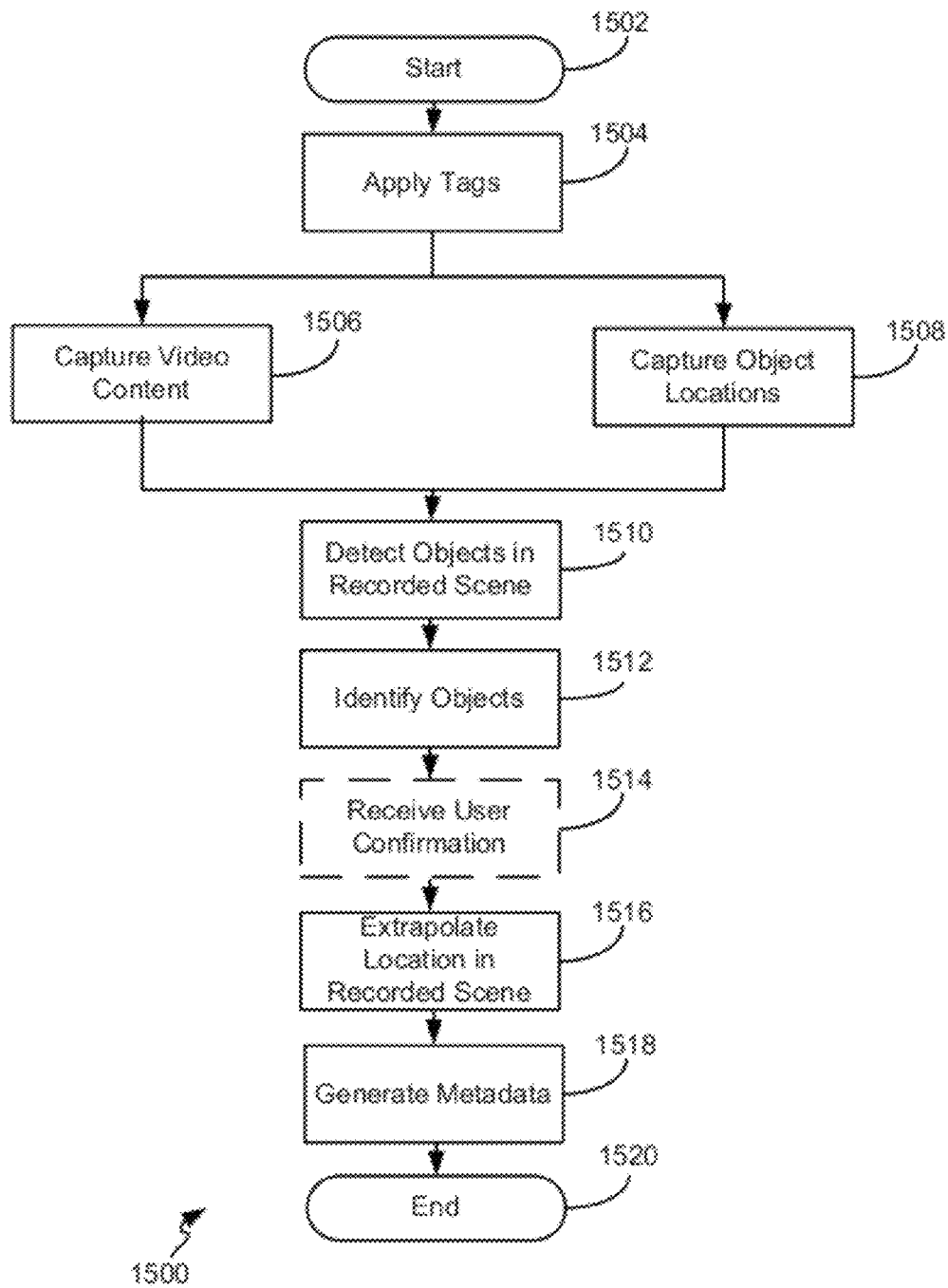
FIG. 15 is a flowchart of methods and systems for detecting positions of objects within a scene in video content, according to a possible embodiment of the present disclosure.
Figure 16:
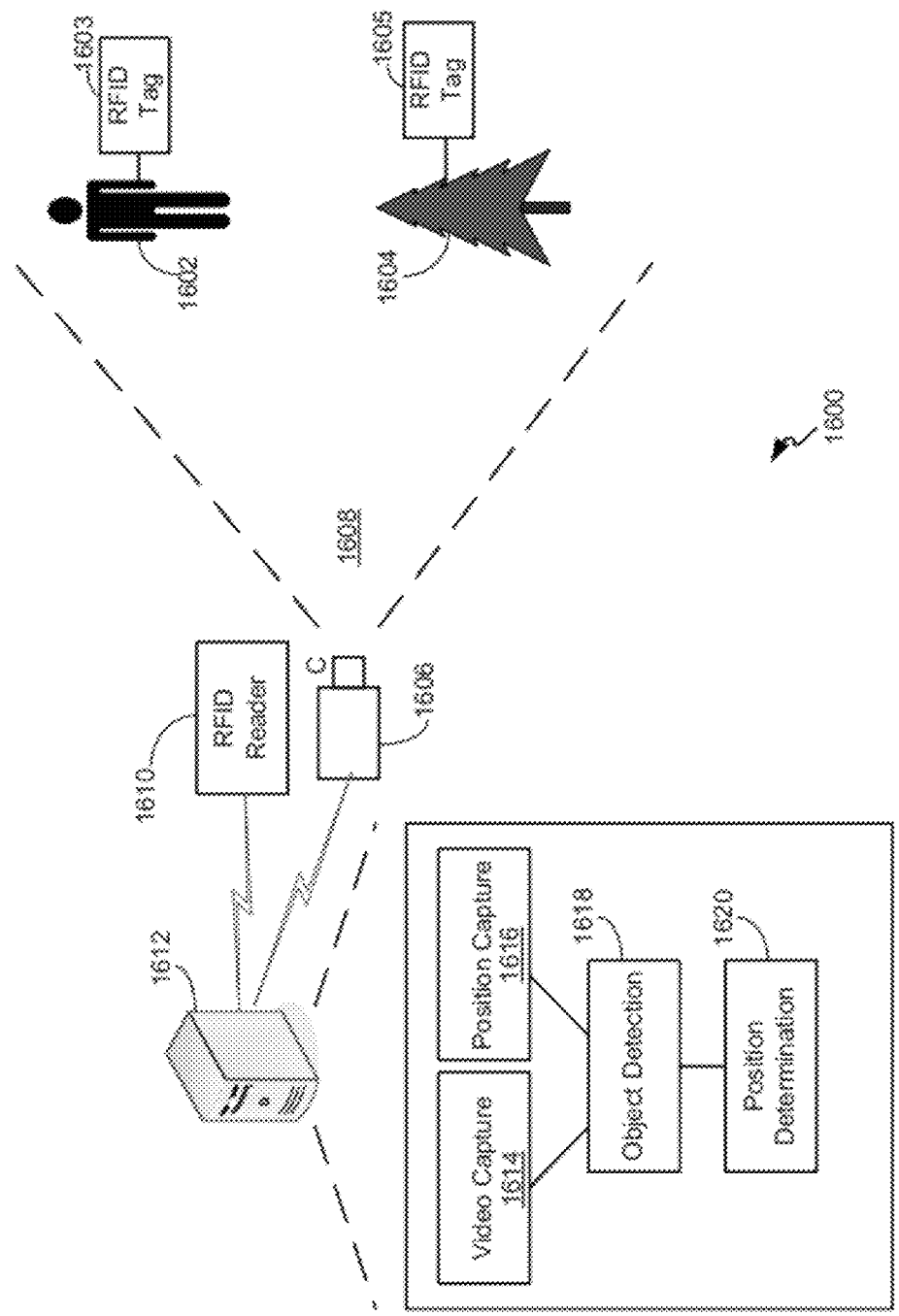
FIG. 16 is a schematic view of a video capture and processing arrangement for detecting positions of objects within a scene in video content using aspects of the present disclosure.

Referring now to FIGS. 6-16, a set of example features and applications of a system for processing, management, and delivery of multimedia content are described, according to the various embodiments of the present disclosure. FIGS. 6 and 7A-7M provide additional details regarding management of metadata in the systems of FIGS. 1-5, above. FIG. 8 illustrates a method for processing multimedia content according to various embodiments of the present disclosure. FIGS. 9-10 provide details regarding identification of objects within the multimedia content for identification, searching, playback and other multimedia enhancements. FIGS. 11-12 relate to extracting text data from multimedia content to provide features such as searchability of verbal components of the multimedia content. FIGS. 13-14 illustrates an example method and system for playback of customized multimedia content for a content consumer. FIGS. 15-16 illustrate a further example application allowing positional tracking of objects within a scene represented in the multimedia content.

In general, and as explained below, multimedia content is processed using the systems described above in connection with FIGS. 1-5 to generate a set of metadata related to that content. The metadata can define features such as objects in the content, a transcript of the content, and position data related to the content. A content consumer can view the content and be provided with a subset of the metadata defining objects and actions relevant to that content consumer, allowing for customization of the content without requiring reprocessing the content for each consumer. These customizations can be provided based at least in part on observed preferences of a content consumer, for example as tracked by the multimedia processing system based on actions taken by that content consumer relative to other content, or previous views of other content.

Figure 6:
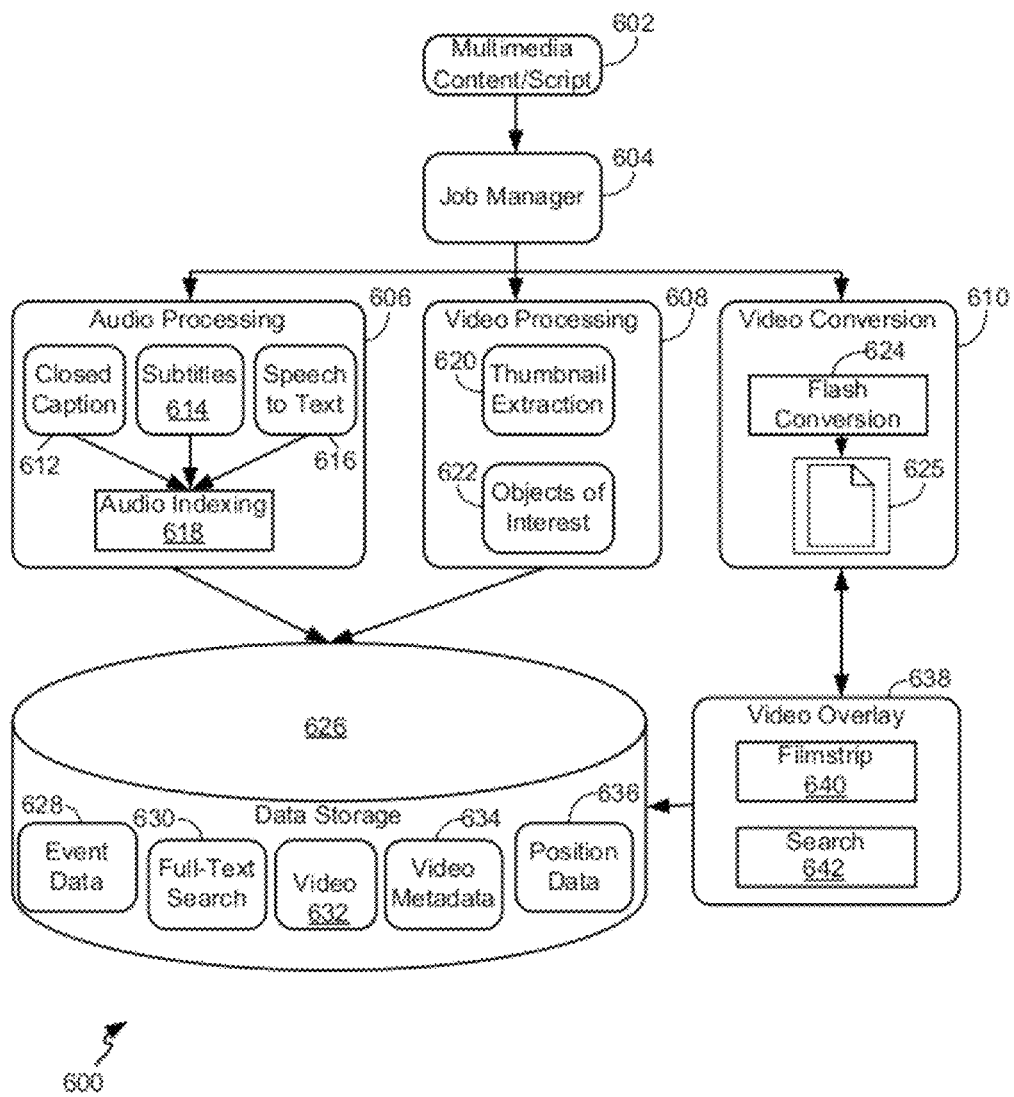
FIG. 6 is a logical block diagram of a logical deconstruction of multimedia content, according to a possible embodiment of the present disclosure.

Referring now to FIGS. 6 and 7A-7M, block diagrams of systems and data useable for processing and storing enhanced multimedia content. FIG. 6 shows a logical block diagram is provided illustrating a system 600 for processing of multimedia content, according to a possible embodiment of the present disclosure. The system 600 generally represents a logical application of the computing systems and networks of FIGS. 1-5 to multimedia content to package the content and create metadata that provides enhanced functionality alongside the content.

In the embodiment shown, multimedia content 602 that is received at the system 600 (e.g., received at a multimedia processing system such as system 104 of FIG. 1) is passed to a job manager 604. The job manager 604 determines the specific processing to occur based at least in part upon commands and preferences received from the content provider, including identification of objects of interest as well as indicators relating to audio processing (e.g., the genre or speech to text dictionary to be used). In some instances, where portions of the multimedia content have been previously processed, only a portion of the available processing may be scheduled to occur to reduce redundancy by not reprocessing content that was already processed.

In some embodiments, a content provider can provide a script alongside the multimedia content 602 to the system 600. In such embodiments, the script can contain a number of descriptions of the content, such as dialog occurring in the content, objects and individuals appearing in the content, as well as mood, scene, and other information that can be used at least in part to assist in generating metadata describing the content for use in connection with the systems and methods of the present disclosure.

The job manager 604 receives identification of objects of interest from a content provider in any of a number of ways, based on the particular object of interest to be defined. Objects of interest are intended to refer herein to objects or appearances appearing in or describing a piece of multimedia content. Example objects of interest include a location at which a scene takes place, a particular person or object appearing in video content, conditions apparent in multimedia content (e.g., lighting, weather, mood, etc.) Additional objects of interest can be identified by a user, further examples of which are described below.

Depending upon the particular parameters and objects of interest selected by the content provider, the job manager 604 can schedule processing of multimedia content at an audio processing module 606, a video processing module 608, and a video conversion module 610. Each of these modules can be executed concurrently (e.g., in parallel), with jobs associated with each module operating on one or more computing systems as defined by a scheduler (e.g., scheduler 406 of FIG. 4).

The audio processing module 606 is configured to process audio content associated with the multimedia content. In certain embodiments, the audio processing module 606 is configured to generate a full text transcript of the audio included in the multimedia content, to allow content consumers to search and review transcripts for the appearance of desired items. Additionally, the transcript can be used to assist in locating objects of interest within the multimedia content, such as items or individuals mentioned during playback of the content.

In the embodiment shown, the audio processing module 606 generally supports a number of different ways of developing a transcript from multimedia content, including closed captioning 612, subtitles 614, and speech to text conversion 616. One or more of these transcript sources can be selected, and the transcript generated from that source can be indexed in an audio indexing module 618 for searching or access. In certain embodiments, the transcript can be generated at least in part based on a script received from the content provider and describing the content.

It is noted that, depending upon the source of the transcript among the varying sources 612-616, accuracy may vary. For example, speech to text conversion programs will typically generate less accurate results than using closed captioning information or subtitle information. Accordingly, in certain embodiments, a hierarchy of preferences as to sources used is applied. In still other embodiments, a plurality of different speech to text algorithms can be applied, and optionally can use subject-specific, genre-specific, or speaker-specific speech to text dictionaries to refine results. An example of an audio processing algorithm to arrive at a text transcript is described below in connection with FIGS. 11-12.

The video processing module 608 is configured to process the video portion(s) of multimedia content to identify one or more objects of interest appearing in the video. As mentioned above, objects of interest correspond to identifiable items in the video that the content provider would like to have identified, for example to allow content consumers to search for those individuals or objects, or to associate one or more actions with the display of those individuals or objects. For example, if a person is identified as an object of interest, metadata can be generated such that, when multimedia content is played and that person appears (or is mentioned) in the content, a predefined secondary action could occur, such as: providing corresponding information for display alongside the video; causing a hyperlink to the person's biography or related works to be displayed; or other features.

In the embodiment shown the video processing module 608 includes a thumbnail extraction module 620 and an objects of interest module 622. The thumbnail extraction module 620 is arranged to generate thumbnails at possible locations the content provider would like to create an object of interest (for example a first frame, a last frame, and immediately following major scene or sound changes in the content). In some embodiments, the thumbnail extraction module 620 generates a series of thumbnails representing scenes throughout the multimedia content. The objects of interest module 622 generates one or more objects of interest as defined in metadata to be associated with the multimedia content. In various embodiments, the objects of interest module 622 can accommodate input from content providers to identify the objects of interest, or can at least partially automatically identify at least candidate objects of interest for confirmation by a user. In certain embodiments, objects of interest can be identified at least in part based on the contents of a script received from the content provider alongside the multimedia content. Further details regarding example systems and methods for generating and using objects of interest are described below in connection with FIGS. 9-10 and 13-14.

The video conversion module 610 converts the received multimedia content from a format in which it is received from a content provider into a format useable with the metadata generated by the audio processing module 606 and the video processing module 608. In certain embodiments, the video conversion module 610 converts multimedia content by encapsulating the video in an Adobe Flash video container, and defining interconnections between the container and metadata. For example, in the embodiment shown, a flash conversion module 624 can create a container 625 that synchronizes with metadata to trigger events external to the multimedia content associated with each object of interest. The container 625 also optionally transmits information to the multimedia processing system relating to the analytics described below.

As previously mentioned, the container 625 can take a number of forms. In various embodiments, the container 625 is configured to include identifying information capable of referencing the metadata generated describing the content, such that a request from a content consumer for the content can also cause a request to be sent to a handler of metadata requests (e.g. request handler 414 of FIG. 4), and fulfilled by metadata associated with that content and selected for that content consumer (e.g., a customized selection of content specifically for that content consumer).

The metadata from the audio processing module 606 and video processing module 608 is passed to a database 626, which collects metadata and other information derived from the multimedia content. The database can be any of a number of different types of databases, such as a Postgres or MySQL database. Other databases, including non-relational databases, could be used as well. In the embodiment shown, the database receives click through events 628, a full text search database 630, video 632, video metadata 634, and position metadata 636 based on processing of content. A brief description of each of these types of data is provided below, as well as in conjunction with the various metadata types described in FIGS. 7A-7M, below.

The click through events 628 are, in certain embodiments, events defined to occur in synchronization with the objects of interest identified by a content provider. Click through events can be defined by a set of event metadata that are applied to a content timeline, and are capable of "firing" during playback of the multimedia content. Metadata describing the click through events 628 can include, for example, the identifier of the content with which the event is related, the time (or range of times) at which the event is active; the duration of the event; the action taken by the event, the object of the event and function that performs the event.

The full text search 630 includes an aggregated group of transcripts of multimedia content configured to respond to search requests relating to the multimedia content. Metadata associated with the full text search 630 can vary, but will at least include the identifier of the multimedia content to which the transcript is related, as well as the full transcript obtained from the content. In certain embodiments, all of the transcription content is stored in a single container; however, it is noted that more than one transcript could be associated with a single piece of multimedia content, with each transcript being assigned a different start and end time, a different speaker (optionally with each transcript operating concurrently if multiple speakers are present in the content), a different subject or topic, or other logical separations. In alternative embodiments, additional search arrangements can be included as well, such as a natural language search, or ontology-based search storage systems.

The video 632 can include processed video clips, as well as full pieces of multimedia content after they are processed by the video conversion module 610. For example, if a full piece of multimedia content is not stored in the database 626, highlights of that content could be stored in the video 632. Video metadata 634 includes any of the data describing the video that can be tracked. For example, the video metadata 632 can include information about objects of interest defined as associated with multimedia content. Additional options for various video metadata 634, and types of information included in the video metadata, are described below.

The position metadata 636 defines the position or location of one or more objects in the video content. The position metadata 636 can take any of a number of forms. In certain embodiments, the position metadata 636 corresponds to GPS metadata associated with one or more pieces of content. In other embodiments, the position metadata 636 can be captured from some other type of position sensor, such as a location sensor or radio frequency identification (RFID) tag. In such embodiments, the positional information will also be assigned to an object appearing in the content, but will relate to relative positions in reference to each other and the capturing video capture device (e.g., camera). In other embodiments, the position metadata 636 can correspond to a position of the consumer of content, and can include, for example, the identity of the consumer, the IP or MAC address of the consumer, the identity of the content being accessed, and a session identifier.

A video overlay module 638 applies features to the flash container generated by the flash conversion module 624 to allow the multimedia content therein to be linked to the data contained in the database 626. The video overlay module 638 includes, in the embodiment shown, a filmstrip module 640 and a search module 642. The filmstrip module links the containerized content to the video metadata 634 and click through events 628, linking the content to allow a user to browse through the content to various predefined or searchable sections. The search module 642 links the containerized content to the full text search 630, allowing searches of the metadata to occur within the player of the containerized content. As previously explained, the containerized multimedia content can be stored in the database 626, or delivered to a content provider for hosting to content consumers, with links back to the data in the database 626 for inclusion of features related to searchability, object recognition, click through events, analytics, and other features.

Referring now to FIGS. 7A through 7M, various additional details regarding data collections tracked by the methods and systems described herein are provided. In certain embodiments, the data collections described herein can be generated at least in part using the system 600 for processing of multimedia content of FIG. 6, or based on subsequent use of that metadata, as generated from interaction with the metadata by content consumers.

FIG. 7A illustrates example event data 628 that can be created by a content provider or third party to be associated with one or more objects of interest in the multimedia content. Generally, the event data 628 defines events that can occur upon interaction with the content. In the embodiment shown, the event data 628 includes an identifier of the media with which the event is associated; a timeline defining a location within the multimedia content when the event becomes available; a duration in which the event is available or occurs; a definition of the event itself; a target of the event, and a function to carry out upon selection of the event. Other organizations of event-based metadata can be provided as well.

Example event data can define actions to take associated with a particular piece of content. For example, if the event data corresponds to display of a hyperlink during a particular portion of the multimedia content, the event would define display of the hyperlink (e.g., a text or image link) at the defined time during the timeline, for the defined duration, and will include a target (e.g., the resulting website) and function (e.g., opening a new browser window using the defined hyperlink). Other actions defined by event data (e.g., accessing files or other multimedia content, or displaying information complementary to a particular portion of the content or defined object of interest) can be defined in the event data 628 as well.

FIG. 7B illustrates example text index information 630 that can be captured, for example using the methods and systems described in connection with FIGS. 11-12, below. The text index information 630 can be used to provide a corresponding transcript alongside playback of multimedia content, or can be used to provide keyword searchability of the multimedia content. In the embodiment shown, the text index information 630 includes a media identifier, as well as the corresponding transcription text. In alternative embodiments, specific start and end times can be defined, as associated with specific segments of the transcription text. In this way, the transcript could be linked, portion by portion, to the multimedia content based on the time at which the transcribed words are played in the content.

FIG. 7C illustrates an example set of content 632 that can be used in connection with the methods and systems of the present disclosure. The content 632 can be stored associated with a content identifier, to allow access of the particular content based on requests from content providers and consumers, and to link the content to metadata. In certain embodiments, the content 632 is stored as containerized content, as described above.

FIG. 7D illustrates a portion of the video metadata 634 of FIG. 6, including video metadata describing specific attributes of content that are common to the content across all playback requests. This video metadata, illustrated as metadata 634a, can include a customer identifier (e.g., the identifier of the content provider who uploaded the content for processing); a content identifier, a description of the content, the content runtime, size, and any attributes associated with the content. The video metadata 634 can be used as baseline metadata to which other metadata (e.g., the event data 628 and objects of interest data 634b described below) can be linked, to provide customized enhancements to the content.

FIG. 7E illustrates additional video metadata, particularly objects of interest data 634b. The objects of interest data 634b defines each of the possible objects of interest associated with a particular piece of content. As described in further detail below in connection with FIGS. 13-14, when a request for playback of the content is received from a content consumer, all or a subset of the objects of interest can be selected for inclusion with the content (alongside other customized metadata, such as the event data 628 above), to provide custom enhanced content playback to that content consumer without requiring the content itself to be changed or reprocessed. In the embodiment shown, the objects of interest data 634b includes the content identifier, as well as a sequence definition for the objects of interest (illustrated as "OISeq"), a timeline at which an object of interest appears in the content, a duration during which the object of interest appears in the content, as well as a position and size description for that object of interest. Optionally, a description and location information for an object of interest can be included as well.

In certain instances, not all of the object of interest data 634b will be used, for example based on the particular object of interest defined. For example, if an object appearing in video content is the defined object of interest, that object would have a particular location and duration within the content; however, if the object of interest is the location where the content is captured (e.g., the region in which a video scene is shot) or a condition of the scene (e.g., weather or lighting conditions), the region of the video may go unidentified. Other examples are possible as well.

FIG. 7F illustrates example location information 636 that can be captured and associated with a person or object within the multimedia content itself. The location information 636 can include identification of the object and associated content, and can relate to absolute position information (e.g., latitude and longitude), and can also include relative positional information, such as a degree of inclination or direction of orientation of a camera relative to the object. In further embodiments, relative positional information between two objects can be captured and stored as well, relating to the multimedia content. Additional details regarding capture and use of positional information in multimedia content are provided below in connection with FIGS. 15-16.

Now referring to FIGS. 7G-7M, additional metadata can be stored using the methods and systems of the present disclosure that define usage and processing of multimedia content by content providers, content consumers, and other third parties (e.g., advertisers). FIG. 7G relates to content consumer account data 702, and can include identification and contact information for the content consumer, as well as history information (or a link to history information) of that content consumer, including content viewed and other tracked information. The content consumer account data 702 can also include username and password information, or other credential information. FIG. 7H includes example session data 704 tracked associated with a particular multimedia content access session by a content consumer, and can include a session identifier, as well as one or more identifiers of pieces of content viewed during that session. The session data 704 can also include, in the embodiment shown, the content consumer's location or other information, such as the IP address or MAC address of the content consumer.

FIG. 7I illustrates example keyword data that can be used in association with particular content to facilitate searching of that content. In certain embodiments, the keyword data 706 can be used as a substitute for the text information 630, or can be used to reference a particular location within the text information to allow searching of content or metadata describing the content. In the embodiment shown, the keyword data 706 includes an identifier of the multimedia content as well as the keyword or keywords associated with that content. Other information can be included in the keyword data as well (e.g., links to a particular location within the multimedia content, or other associated keywords, etc.). In certain embodiments, the keyword data 706 can be made available to external search engines, to allow the content or portions of the content to be made available for search access by search engines that are remote from and unaffiliated with the systems and methods described herein.

FIG. 7J illustrates example administrative data 708 useable to enable account-based use of the distributed metadata content processing systems of the present disclosure. The administrative data 708 includes a customer identification, as well as name, address, phone, email or other contact information, as well as user credentials associated with the customer (e.g. username and password information). Additionally, various preference information can be included in the administrative data.

FIG. 7K illustrates example analytics data 712 tracked for each content consumer requesting access to particular multimedia content. In the embodiment shown, the analytics data 712 includes a session identifier, as well as an action that takes place, a time at which various events take place, and other information defining the action. In certain embodiments, the action taking place can be selection of an object of interest appearing in the multimedia content. In further embodiments, the action taking place can be a search of one or more pieces of multimedia content. Other example information that can be tracked is shown in FIG. 7L, in which additional analytics data 714 includes: a viewer identifier, a number of views of selected content, which if any events, such as user selection or other events (defined using the event data 628 of FIG. A, above) are selected by the content consumer, a number of completed plays of the content, an amount of time during which the content is viewed, whether the content is muted/unmuted, window resizing operations (collapse/expand operations), whether the content is paused or resumed, rewound, minimized, or closed, whether an invitation associated with the content is accepted, or whether the content appears in search results or is specifically searched. Additionally, user ratings of the content can be tracked using the analytics data 714 as well. Additional example analytics are described in the proposed IAB Standards for Online Advertising Metrics (Digital Video In-Stream Ad Metrics Definitions, June 2008). Furthermore, other events can be tracked as well as associated with a particular content consumer, and can be used or provided to a decision engine capable of matching a content consumer to possibly-relevant objects of interest to that consumer, as explained in further detail in connection with FIGS. 13-14, below.

FIG. 7M illustrates example advertisement data 716 that can be used in association with multimedia content, to link one or more advertisements with multimedia content during playback. In the embodiment shown, the advertisement data 716 can include an advertiser identifier, a definition of an advertisement, and associated topics, keywords, or content that can be linked to the advertisement. In certain embodiments, the advertisement data 716 is used to link the content to advertisements during playback; in alternative embodiments, the advertisement data 716 is managed to track advertisements appearing with content, and the matching of advertisements and content occurs based on a decision process separate from the content delivery system of the present disclosure.

Referring now to FIG. 8, a flowchart of methods and systems 800 for processing and delivering multimedia content is shown, according to a possible embodiment of the present disclosure. The methods and systems described in FIG. 8 represent an overall workflow useable with content providers and content consumers to deliver multimedia content having enhanced features, and is operable at least in part within a multimedia processing system, such as system 104 of FIG. 1.

In the embodiment shown, the method 800 is instantiated at a start operation 802, which corresponds to initial availability of a multimedia processing system (e.g., system 104 of FIG. 1). A content receipt operation 804 corresponds to connection to the multimedia processing system by a content provider, and transmission of multimedia content and optional associated scripts to the system.

A plurality of processing operations occur to generate object metadata, text metadata, and format the received multimedia content, for example to generate and store the various types of content-specific metadata described above. In the embodiment shown, an object metadata operation 806 generates object metadata corresponding to information about the content overall, as well as objects appearing in or mentioned in the multimedia content. For example, the object metadata can define the overall genre, title, producer, creation date, length or other characteristics of the multimedia content, but can also define people or objects appearing in the content as well. Actions can be linked to those people or objects, as illustrated in the examples described below in conjunction with FIGS. 9 and 13-14. In certain embodiments, at least a portion of the object metadata operation 806 can be performed in the video processing module illustrated in FIG. 6. As described therein, differing embodiments will encompass differing levels of user interaction to define objects of interest, to identify thumbnail images including those objects of interest, and other operations.

A text metadata operation 808 defines text metadata associated with the multimedia content. The text metadata can take any of a number of forms, and can include a transcript of audio data included in the multimedia content, as well as additional textual information that a content presenter would like to display alongside the streamed multimedia content, such as additional contextual information, advertisements, or hyperlinks to other websites or content. In certain embodiments, a transcript can be generated using a speech-to-text algorithm, such as that illustrated in FIGS. 11-12, below. The transcript can be indexed, as described below, to allow content consumers to search the spoken text transcript, as well as other descriptive information related to the multimedia content. In certain embodiments, at least a portion of the text metadata operation 808 can be performed in the audio processing module illustrated in FIG. 6.

A container operation 810 applies a container to the received multimedia content, converting the content to a format that is able to be linked to external data for synchronization. (e.g., container 625 of FIG. 6 linked to the metadata generated by the object metadata operation 806 and the text metadata operation 808). In certain embodiments, the container operation generates a version of the multimedia content in an Adobe Flash format; other embodiments are possible as well, to the extent that such linked metadata could be used. For example, HTML5, Microsoft Silverlight, or other formats could be used as well.

A storage operation 812 stores the content and associated metadata for use. In certain embodiments, the storage operation 812 corresponds to storing the multimedia content and metadata in a multimedia processing system including distributed computing arrangement or computing grid, such as those disclosed in FIGS. 2-4, above. In such embodiments, the multimedia processing system (i.e., the overall distributed computing architecture) can respond directly to search requests or playback requests from content consumers seeking to search for information related to the multimedia content.

In alternative embodiments, only the metadata describing the multimedia content are stored in the distributed computing arrangement, and the content is returned to the content provider. In such embodiments, when a content provider receives a request from a content consumer for the content, the content provider can deliver the content (e.g., via streaming delivery) and can transmit a request to the multimedia processing system requesting the metadata associated with the content. The multimedia processing system can then deliver the metadata to the content provider or directly to the content consumer. This arrangement further distributes the computing resources required to deliver the enriched multimedia content, by offloading the content streaming tasks to content providers, while concurrently allowing the content provider to maintain control over their content.

In the various embodiments of the present disclosure, the object metadata operation 806 and text metadata operation 808 generate each of the possible object metadata definitions that can be associated with a piece of content, such that when the content is selected for playback, certain aspects of the metadata can be selected to be provided with the content. As such, different content consumers may receive the content associated with different enhancements (e.g., different objects of interest). Additionally, a content provider can change the definition of any of the object metadata without recompiling the multimedia content overall, and the same content consumer may have a different experience with the same content based on selection and delivery of the content with a different set of metadata. In each of these circumstances, the multimedia content itself would not be required to be delivered directly from the same systems providing the metadata, and would not need to be reprocessed to include these additional features for each customized set of enhancements provided to a content consumer.

A content request operation 814 receives a request related to multimedia content. The specific type of request received in the content request operation 814 can take a number of forms, such as a search query related to keywords appearing in one or more fields of metadata associated with the content (e.g., titles, authors, producers, genre, etc.) or in the transcript or other text associated with one or more pieces of content. Alternatively, the request can be a request for playback of a certain piece of multimedia content, in which case the provide metadata operation 816 provides to the content consumer (or content provider, depending upon the particular implementation selected) the metadata (and optionally the content) requested.

A provide metadata operation 816 provides metadata (and optionally the multimedia content) in response to the request. The provide metadata operation 816 selects at least a portion of the metadata associated with the content (e.g., including definitions of objects of interest, events, transcript information, position information, etc.) for inclusion with the content during playback. The particular metadata selected for inclusion by the provide metadata operation 816 may vary according to a number of factors, for example based on preferences set by the content consumer, by observed viewing habits of the content consumer (e.g., as defined in the analytics data described above in FIGS. 7K-7L), or other factors. In certain embodiments, the preference information can be provided to a remote decision engine that can then indicate a particular type, genre, or other grouping of enhancements to include with the multimedia content.

In certain embodiments in which multimedia content is provided from the multimedia processing system (rather than from a content provider), the content can be displayed within any of a number of flash-compatible playback tools. For example, in various embodiments, the provide metadata operation 816 can also stream the multimedia content via a flash player such as the JW FLV Player, Flowplayer, or Adobe Open Source Media Framework (OSMF). The JW FLV Player supports playback of various formats useable within an Adobe Flash Player (e.g., FLV, MP4, MP3, AAC, JPG, PNG and GIF). It also supports RTMP, HTTP, live streaming, various playlists formats, a wide range of settings and an extensive JavaScript API. This player also supports customized appearances, allowing each content provider to customize the appearance and functionality of the player (e.g., relating to sharing, recommendations, searching, analytics and ad serving). Flowplayer is a video player for Flash Video in FLV and H.264 formats available from Flowplayer Ltd. of Helsinki, Finland. Flowplayer is configurable and customizable, and can also be embedded into any of a number of third-party websites as desired. Adobe OSMF, available from Adobe Systems, Inc. of San Jose, Calif., provides a further example of a configurable playback mechanism in which feedback and interactivity is possible.

In such embodiments, the container used with the multimedia content includes "hooks" or communicative connections back into metadata storage for communicating analytics data and receiving metadata for enhancement of the content. The actual metadata objects stored in the database (described in further detail in FIGS. 7A-7M, above) can be retrieved on the fly based on some Objects and multimedia identifier for the video. If details regarding the video change, nothing needs to be done other than update the metadata store.

In still further embodiments, the request operation 814 can correspond to a request for analytics related to the content, such as the number of times viewed, the number of times the content appears in search results, frequency in which content is viewed, or other factors such as number of contributors, number of syndications, top played content, number of plays, play latency, play drop-offs, number of user interactions with media, or media indicators per media type. Example analytics deliverable to a content consumer or content provider are explained above in connection with FIGS. 7K-7L.

An optional advertisement operation 818 delivers one or more advertisements associated with the multimedia content. The advertisements can be delivered, in various embodiments, alongside returned content or metadata delivered by the metadata operation 816, such that the advertisements would appear to a content consumer alongside search results, synchronized to playback of multimedia content, or other arrangements. Example advertisement data is linked to the multimedia content through use of advertisement definitions in metadata as described in connection with FIG. 7M.

An optional analytics collection operation 820 collects information regarding the information requested from the multimedia processing, system. In various embodiments, a wide variety of metadata can be collected. For example, the analytics collection operation 820 can collect information from the containerized multimedia content, which can be figured to deliver analytics regarding playback to the multimedia processing system. Example analytics can include basic linear advertisement analytics (e.g., views, user selection actions taken relating to an object of interest, completed play, time viewed, and percentage complete), other linear analytics (muted, unmuted, collapse, expand, pause, resume, rewind), and non-linear analytics (view, user selection, invitation acceptances, minimize, close, overlay durations, etc.). Using this analytics data that is captured, the multimedia processing system of the present disclosure can track actions taken by content consumers, for example to provide detailed information regarding objects of interest that the content consumer acts upon or views frequently. This information can then be used to assist in determining which objects of interest or advertisements are most likely to be successful if displayed to a user (i.e., to induce the user to click on the object of interest or advertisement in order to purchase a related product).

To encourage the ability to track such analytics, various content providers and consumers can register their identities with the multimedia processing system, and have user preferences stored therein. In exchange for personal information from content providers and consumers (which can be stored in the content consumer account data 702 and administrative data 708 of FIGS. 7G and 7J, respectively), various analytics could be incorporated that would inform content providers of the preferences of those viewing their videos, and content consumers could be provided with free access to enhanced content (i.e., content enhanced with searchability and user selection behaviors as described herein).

An end operation 822 generally corresponds to completed receipt, processing and delivery of at least a portion of multimedia content or metadata describing multimedia content to a content consumer.

As can be seen in FIGS. 6-8 overall, a variety of processing steps can occur with respect to multimedia data, and require substantial computing time to complete. As such, the various distributed computing systems described in FIGS. 1-5, above, allow for segmenting the processing into discrete portions (e.g., audio, video processing separately, etc.) and parallel, pipelined processing of the data to ensure fast content processing and resulting usability for content providers. Concurrently, multimedia content can be enhanced in a customized manner for each content consumer through use of selected portions of processed metadata without requiring reprocessing of the multimedia content itself.

Referring now to FIGS. 9-10, methods, systems and user interfaces are described which illustrate example embodiments useable for identification of objects of interest in multimedia content are described. The objects of interest identified in the methods, systems, and user interfaces can be selected for inclusion with multimedia content as described above, and can be linked to user selection events capable of providing interactive enhancements to the multimedia content. The various embodiments described with respect to FIGS. 9-10 illustrate varying levels of interactivity by the content provider, allowing the content provider to mark up a video with the features mentioned above. The varying levels of automation described in the various embodiments requires integrating differing types of multimedia technologies (e.g., facial recognition for detecting the presence of particular individuals as candidate objects of interest, as described below).

FIG. 9 is a flowchart of methods and system 900 for detecting objects of interest in multimedia content, according to a possible embodiment of the present disclosure. The methods and systems of FIG. 9 are instantiated at a start operation 902, which corresponds to initial login from a content provider for submitting and processing multimedia content.

A receive content operation 904 corresponds to receipt of content from the content provider, for example at the frontend 402 of FIG. 4, above. The content received from the content provider can take any of a number of forms, and be received in any computer-recognizable format capable of being converted into or supported by a Flash-compatible player.

After the content is received, a candidate object generation operation 906 generates candidate objects of interest from the multimedia content. In certain embodiments, the candidate object generation operation 906 splits the multimedia content into a plurality of sections, and generates a thumbnail image associated with each of those sections for preview by the content provider (e.g., as illustrated in FIG. 9, described below). The candidate object generation module can be performed by any of a number of object recognition programs, including computer vision programs. Example computer vision tools include OpenCV, which is a library of motion tracking, facial recognition, gesture recognition, object identification, segmentation, and calibration tools. Other tools, such as MatLab or scale-invariant feature transform (SIFT) algorithms could be included in the object detection process as well.

In one possible embodiment, the object generation operation 906 uses a neural network or other learning model to acquire knowledge of objects typically recognized or identified by users as objects of interest. One example software package useable to build such a model for predictive learning in a vision-based context is developed by Numenta, Inc. of Redwood City, Calif. Other similar software packages could be used as well, such as SmartCatch image detection from Vidient Systems, Inc. of Sunnyvale, Calif. or Alsight Cognitive Video Analytics from Behavioral Recognitions Systems, Inc. of Houston, Tex.

Optionally, the candidate object generation operation 906 can generate a number of candidate objects of interest defined by the content provider. For example, the content provider may indicate that 10 sections should be made from the content (or some other granularity, such as one every 5-10 seconds, or other metric). The candidate object generation operation 906 would display the thumbnails to the content provider, who could then select a relevant thumbnail and select one or more objects of interest, or objects appearing in that thumbnail image.

An objects of interest module 908 accordingly receives selection of the objects of interest from the content provider. The selection can occur in any of a number of ways. In some embodiments, the content provider can define a square surrounding the object appearing in a thumbnail, and can define the length of time that object appears following the frame with which the thumbnail is associated. In other embodiments, the content provider can click in the center of the candidate object of interest, and the multimedia processing system can extrapolate the boundaries of the object. The content provider could then edit the boundaries to ensure that the object of interest is encompassed by the selection. In still further embodiments, boundaries of a number of candidate objects of interest could be automatically detected within one or more thumbnails, and the content provider could then select from a list of candidate objects of interest whose boundaries are already defined.

In some embodiments, during the objects of interest operation 908, the content provider will also be afforded the opportunity to edit the multimedia content. In such embodiments, the content provider can be presented a user interface for editing and resequencing content, for example as described below in connection with FIG. 10.

Once a user has selected one or more objects of interest, a number of optional detection algorithms can be applied to further define those or other objects of interest. In the embodiment shown, a boundary detection operation 910 applies one or more object tracking and boundary detection algorithms to the multimedia content to detect the area encompassed by the object of interest. In some embodiments, the boundary detection operation 910 is applied to adjacent video frames in the multimedia content to determine the duration in which the object of interest is displayed. Optionally, additional detection algorithms can be applied as well by a detection operation 912. These additional detection algorithms can include facial recognition or recognition of objects based on synchronized audio data. In certain embodiments, a detection algorithm can be used based on or as complementary to object of interest identification processes using objects identified in a script received alongside the multimedia content. Other techniques are possible as well. These additional detection algorithms allow for additional automation of the detection process for candidate objects of interest for selection by a user.

In certain embodiments, the boundary detection operation 910 and other detection operations 912 can be performed using the image analysis programs described above with respect to the candidate object generation module 906. In still further embodiments, the boundary detection operation 910 or other detection operation 912 can be performed by applying a plurality of different detection algorithms against the same content or thumbnail, for example algorithms from different software packages. In such embodiments, the results of detection algorithms, such as boundary detection algorithms, having similar results can be selected and averaged or otherwise chosen to improve the overall detection process (by eliminating outliers in the process).

The operations 908-912 of method 900 can vary in order in execution, such that various boundary detection or other detection algorithms can occur prior to receiving selection of objects of interest by a content provider. In such embodiments, the detection algorithms of operations 910-912 can essentially be included in operation 906 for generating candidate objects of interest for confirmation by the content provider.

An action definition operation 914 allows a user to define one or more actions associated with each object of interest identified in the multimedia content. Any of a number of different types of actions can be defined. Example actions include display of contextual information identifying the object, as well as including click through actions such as a hyperlink to related content, or other sections of the same piece of content.

A metadata generation operation 916 generates metadata defining the objects of interest and the actions to be taken as associated with each of the objects of interest. In certain embodiments, the information generated by the metadata generation operation 916 can be stored in a database, such as corresponding to the click through events 628 and video metadata 634 of FIGS. 6, 7A, and 7D-7E, above. The process can be terminated at an end operation 918, which corresponds to completed processing of the multimedia content. The metadata generation operation can, in certain embodiments, generate a "filmstrip" which is a strip of thumbnails containing "objects of interest" from the video. These objects of interest can be items, people, or conditions in the video that the viewer may be interested in, as previously described The content provider can define the order and arrangement of scenes in the timeline, similarly to the manner in which particular objects of interest are defined.

In addition to the above, additional operations can be performed on the multimedia content that are optional to the above process. For example a content provider may wish to preview the playback of the content and associated metadata; an example of such a playback arrangement for preview by a content provider or for viewing by a content consumer is illustrated in FIG. 14, described below. Additionally, it is recognized that one or more objects of interest can be generated during processing of the multimedia content, and more than one object of interest could be active at once during playback of the content.

Using the method 900 of FIG. 9, the content provider can access the frontend of a multimedia processing system at any time to add, change or delete information associated with multimedia content. That information is then made available for broadcast\multicast to a selected set of multimedia content. This information that can be added to content "on the fly" can include breaking news on upcoming events, latest product offers, etc. and is displayed when the video is consumed by the customer. In certain embodiments, updates can be applied to one or more pieces of content based on a common attribute in metadata, and can also be delivered based on the identity of a viewer.

Furthermore, the method 900 allows communication with a multimedia processing system via a frontend in which various data can be communicated between the content provider and the multimedia processing system to direct editing of the content. Example messages passed between the content provider and the multimedia processing system can include a provider identifier, a contact identifier, an identifier of the specific content and a project identifier, as well as sizes and lists (e.g., in comma-separated value file format or other bulk data format) of objects of interest, keywords, transcript information, services, or other content descriptors.

Now referring to FIG. 10, a user interface 1000 is illustrated providing an example illustration in which a content provider can interactively define an object of interest, as well as to edit the content for viewing. In the embodiment shown, the user interface 1000 can be presented by a multimedia management frontend, such as frontend 402 of FIG. 4. The user interface 1000 can be configured for defining metadata associated with multimedia content, for example to define objects of interest appearing in the content. In the embodiment shown, the user interface 1000 includes an active window 1002, a thumbnails window 1004, an actions definition area 1006, and a timeline 1008.

The active window 1002 represents a current video scene being acted upon by a content provider. The active window 1002 displays a current image of a scene including one or more candidate objects of interest (e.g., person 1005a and house 1005*b*). A user can select one or more of the objects of interest, for example by clicking and dragging to draw a square around the object of interest, or in certain embodiments by clicking on the object itself. In some embodiments, the scene can be displayed alongside a list of identified objects of interest within the scene. In such cases, the user may also be presented with a list of candidate objects located in the current scene displayed in the active window 1002. Other methodologies for selecting objects of interest from the candidate objects of interest are possible as well.

The thumbnails window 1004 displays user-selectable thumbnail images, with each of the thumbnail images representing a scene in the multimedia content. In certain embodiments, each of the thumbnail images represents a different scene in which candidate objects of interest have been preliminarily identified by the multimedia processing system. A content provider can click on one or more of the thumbnails to preview that section of the content, or can select it for inclusion in a timeline (as described below) using any of a number of techniques (e.g., double click, click-and-drag, etc.).

The actions definition area 1006 defines the actions to be taken with respect to a currently selected object of interest. Once a content provider selects an object of interest in the active window 1002, that content provider can define any of a number of actions to be taken. In the example shown, the person 1005*a* is selected, and actions to be taken include displaying a message (e.g., "Message Here") as well as providing a hyperlink to a predetermined site, such as a site providing additional information about person 1005*a*, or about the scene in general.

The timeline 1008 allows a content provider to select one or more of the thumbnails from the thumbnail window for layout in sequence, as well as to direct previewing of the video. In the embodiment shown, the timeline includes a video timeline layout 1010 as well as an audio timeline layout 1012. When a user selects a thumbnail from the thumbnail window, that thumbnail can be added to the timeline in a desired position. Once in the timeline, the user can view scenes in the clip represented by the thumbnail to select objects of interest and their duration. In the embodiment shown, the timeline includes a current location bar 1014 that allows the user to navigate through the one or more scenes included in the timeline, as well as to preview the overall content within the timeline 1008. The audio timeline layout 1012 allows the content provider to add one or more sounds into the timeline (e.g., voices, music, etc.), as well as to view or reference transcript data as associated with the timeline to link words described in the timeline to objects of interest as well.

In certain embodiments, upon initial processing of multimedia content the multimedia processing system can place scenes in the timeline 1008 in order of when they occurred in the multimedia content. In such an arrangement, the content provider can easily step through the scenes to select objects of interest for which metadata should be generated. This could be the case, for example, where the content itself would not be edited, but metadata to accompany the content is created.

Once the content provider has made any edits to the multimedia content that are desired, that content provider can elect to save and finalize the content. The metadata and multimedia content can then be saved, for example to a database (e.g. database 626 of FIG. 6) for retrieval upon request. When the content is saved, the content can be passed back to one or more computing systems, for example the grid 408 of FIG. 4, for processing of the multimedia content and generation of the associated metadata defining objects of interest, user selection events, and other features as allowed by the user interface 1000.

It is understood that the content provider can access a user interface such as interface 1000 to further edit the content or define additional objects of interest as desired, to continually enhance the same content. If the content remains unchanged (i.e., scenes are not reordered), the content need not be reprocessed, but the metadata can simply be edited, allowing for changes to the enhancements provided with the content without affecting the content itself.

Now referring to FIGS. 11-12, methods and systems for converting audio information in multimedia content to text information are illustrated, according to a possible embodiment of the present disclosure. The method 1100 described in FIG. 11 allows a content provider to create a transcript from multimedia content to assist in navigation of that content as well as searchability of the content. The method 1100 is instantiated at a start operation 1102, which corresponds to access of a multimedia processing system by a content provider. A video operation 1104 receives multimedia content, such as a video containing audio and video components. In certain embodiments, the video operation 1104 corresponds to receipt of multimedia content 602, as illustrated in FIG. 6.

A job manager 1106 receives the multimedia content and routes it to an audio processing module, such as module 606 of FIG. 6, if determined necessary by an audio processing determination operation 1108. A written transcript operation 1110 detects whether a written transcript is already associated with the multimedia content. If such a transcript already exists (e.g., has been received from the content provider), no additional processing may be necessary, since the transcript will be assumed to be the most accurate source of information linking (e.g., synchronizing) the transcript to the content. Hence, operational flow proceeds to place that transcript in a full text search database 1114. If no transcript exists, a subtitle detection operation 1112 detects any subtitles included in the content, and determines whether those subtitles are formatted to be synchronized with playback of the content. If the subtitles are synchronized, the subtitle information and synchronization information are stored for indexing in the full text search database 1114. In certain embodiments, the full text search database 1114 can correspond to full text search 630 of FIG. 6, above, and can be any of a number of different types of database (e.g., Postgres, Lucene, MySQL, etc.). Operation of the method 1100 can terminate at an end operation 1116, signifying completed processing of subtitles to create the transcript.

If subtitles are not correctly formatted, a synchronization operation 1118 synchronizes the textual information included in the subtitles to the video by generating metadata assigning timestamps to portions of the subtitles. A transcript generation operation 1120 generates a transcript from the synchronized subtitles and timestamps. The transcript can be transmitted to the full text search database 1114 for indexing and to be available for search. Additionally, a user return module 1122 returns the transcript to the content provider for review for accuracy (e.g., to ensure that the transcript is synchronized with any corresponding video, and to ensure text accuracy). Operation of the method 1100 can terminate from the user return module 1122 at an end operation 1116, again signifying completed processing of subtitles to create the transcript.

Either concurrently with or as an alternative to subtitle processing, a closed captioning operation 1124 determines whether closed captioning information is included with the multimedia content. Closed captioning information is typically information that is transcribed from multimedia content by a human, and therefore will typically represent the words that are spoken in the content to a high degree of accuracy. If the closed captioning operation detects closed captioning information present in the multimedia content, an extraction operation 1126 extracts this information from the multimedia content and creates a text representation of the words spoken during playback of the multimedia content. The text representation is transmitted to the synchronization operation 1118, which synchronizes the text representation to the content by assigning timestamps to the text representation. As previously described regarding the subtitle information, a transcript generation operation 1120 generates a transcript from the text representation and timestamps, which is transmitted to the full text search database 1114 for indexing and subsequent search.

If no closed captioning information is present, an audio separation operation 1128 strips, or extracts, the audio from the multimedia content. The audio information is then analyzed, in a speech to text conversion operation 1130, to convert audio information to text information. The speech to text conversion operation 1130 can take a number of forms. In certain embodiments, the speech to text conversion operation 1130 performs a plurality of different types of speech to text conversions, and based on the observed accuracy of those conversions generates an amalgamated text representation based on that information, as described below in connection with FIG. 12. For example, the different speech to text conversion programs can be different types of programs, or the same program applying different speech to text dictionaries. Different speech to text dictionaries could be subject-specific, speaker-specific, language-specific, or trained by a particular individual or individuals. Other arrangements are possible as well.

From the speech to text conversion operation 1130, operational flow proceeds to the synchronization operation 1118, which synchronizes the text representation to the multimedia content by assigning timestamps to text received from the speech to text conversion operation 1130. As previously described regarding the subtitle information, a transcript generation operation 1120 generates an amalgamated transcript from the amalgamated text representation and timestamps, which is transmitted to the full text search database 1114 for indexing and subsequent search.

It is recognized that the speech to text conversion operation 1130 can be performed concurrently with use of an existing transcript, for example to provide training to speech-to-text generation dictionaries, or to validate the transcript.

FIG. 12 is a schematic block diagram of a system 1200 for performing speech to text conversions, according to a possible embodiment of the present disclosure. The system 1200 illustrates an arrangement in which a plurality of speech to text conversion programs 1204a-c are applied to audio data 1202 extracted from multimedia content, as explained above in FIG. 11. In the embodiment shown, each of the speech to text conversion programs 1204a-c typically has integrated therein a speech to text dictionary that has been trained using previously validated speech-text associations.

The speech to text conversion programs 1024a-c can differ in varying ways to provide different results in terms of text generated. For example, the programs 1204a-c can differ by being from different vendors, different versions of the same software, or trained differently. Although three different programs 1204a-c are illustrated, it is recognized that more or fewer speech to text conversion programs could be used.

Regarding use of programs from different vendors or sources, it is recognized that a number of sources provide speech to text conversion programs that approach the conversion differently. The two primary types of speech engines are large vocabulary continuous speech recognition (LVCSR) engines and phonetic engines. LVCSR engines depend on a language model that includes a vocabulary/dictionary for speech-to-text conversion of audio files. The text file is then searched for target words, phrases and concepts. Phonetic-based applications separate conversations into phonemes, the smallest components of spoken language; they then find segments within the long file of phonemes that match a phonetic index file representation of target words, phrases and concepts.

Example sources of speech to text conversion programs performing LVCSR-based conversions can include SPHINX-based software, such as the Sphinx-2 through Sphinx-4 or PocketSphinx programs developed at Carnegie Mellon University in Pittsburgh, Pa. Other vendors of LVCSR-based conversions include the Julius LVCSR engine currently maintained by a project team at Nagoya Institute of Technology in Nagoya, Japan, as well as Adobe Soundbooth of Adobe Systems, Inc, Palo Alto, Calif., and Lumenvox speech recognition software from Lumenvox, LLC of San Diego, Calif.

Phonetic-based applications useable as one or more of the speech to text conversion programs 1204a-c can include, for example, Nexidia audio processing software from Nexidia, Inc. of Atlanta, Ga.; Aurix speech analysis software from Aurix Ltd. of Malvern, United Kingdom; or Nuance Recognizer or Dragon NaturallySpeaking software from Nuance Communications, Inc. of Burlington, Mass.

In addition to using speech to text conversion software from different vendors, it is recognized that each type of software can be trained differently to arrive at different transcription results. In some examples, one or more of the speech to text conversion programs 1204a-c can be trained using a specific vocabulary relating to the subject or genre of the content to be transcribed. Additionally, the speech to text conversion programs could be trained using the voice of a known speaker, if that speaker's voice is particularly common in content and sufficient to train the software (e.g., the speaker is an actor or other widely recorded individual).

A user feedback operation 1206 includes displaying the generated texts from the speech to text conversion programs 1204a-c, and allowing the user (e.g., the content provider) to select one or more portions of a generated text to indicate its accuracy or inaccuracy. The user feedback operation 1206 optionally includes additional training of one or more of the speech to text conversion programs 1204a-c such as by voice training, selection of one or more words as correct speech to text translations, or other feedback mechanisms. Each piece of feedback provided by the user in operation 1206 can be passed to one or more of the speech to text conversion programs 1204a-c (and related dictionaries), such that each program can improve in accuracy based on a correct (or incorrect) transcription in one of the programs.

In certain embodiments, the user feedback operation 1206 incorporates training of one or more of the speech to text conversion programs 1204a-c using an SRI Language Modeling toolkit (SRILM) of SRI, International of Menlo Park, Calif. SRILM is a toolkit for building and applying statistical language models (LMs), statistical tagging and segmentation, and machine translation. The SRILM toolkit uses N-gram language modeling, and includes a set of C++ class libraries implementing language models, supporting data structures and miscellaneous utility functions; a set of executable programs built on top of these libraries to perform standard tasks such as training LMs and testing them on data, tagging or segmenting text, or other options; and a collection of miscellaneous scripts facilitating related tasks.

Once the system 1200 reaches acceptable accuracy, the user can indicate in the user selection operation 1206 that the transcript is acceptably accurate, and amalgamated text 1208 is constructed. The amalgamated text is a result of user selection of results from one or more of the speech to text conversion programs 1204a-c, depending upon user feedback. The amalgamated text can be returned to an overall system, such as described above with respect to FIG. 11, for synchronization with multimedia content and construction of an amalgamated transcript from the various component transcripts and feedback for storage and indexing.

Now referring to FIGS. 13-14, various methods and systems for delivery of multimedia content to a content consumer are described. In general, the methods and systems allow for customized enhancements to content to be delivered to a content consumer alongside requested content. FIG. 13 illustrates an example method 1300 for delivering customized, enhanced content. In the embodiment shown, the method 1300 is instantiated at a start operation 1302, which corresponds to initially making available multimedia content and associated metadata for use, searching, and playback by a content consumer. A container operation 1304 corresponds to applying a container to processed multimedia content, such as a Flash container as previously described. In certain embodiments, the container operation 1304 can be performed by the multimedia processing systems of the present disclosure, with the container and associated metadata being stored either by the multimedia processing systems or managed by the content provider.

A request operation 1306 corresponds to receipt of a request for the multimedia content. Different types of requests can be received in various embodiments. In one embodiment, a request corresponds to a request for playback of content received at the multimedia processing system, for example at the request handler 414 of FIG. 4. In an alternative embodiment, the request is originally received by a content provider and is forwarded to the multimedia processing system for selection and delivery of metadata to be linked to the multimedia content hosted by the content provider. In still further embodiments, the request can correspond to a search request related to the multimedia content.

A metadata association operation 1308 corresponds to selection and association of a portion of the generated multimedia data with the content identified by the request. For example, the metadata association operation 1308 can trigger a process by which specific metadata is selected for a content consumer, for example based on that content consumer's preferences. An example of such preference-based metadata selection is described below in connection with FIG. 14. A content providing operation 1310 provides the metadata and optionally the associated content for review or playback by a content consumer. Optionally, the content provided can be reviewed one or more times, and enhancements provided with the content can be reviewed and acted upon as defined by the user selection events as described above. An end operation 1312 corresponds to completed delivery of the content.

FIG. 14 is an example user interface 1400 useable for preview or playback of the multimedia content, according to a possible embodiment of the present disclosure. The user interface 1400 can be provided by which a multimedia content processing and delivery system, such as the systems described previously herein, can provide to a user the enhanced multimedia content described herein.

In the embodiment shown, the user interface 1400 includes an active window 1402 displaying the content as it is played. The active window 1402 includes a content playback mechanism capable of replaying multimedia content, such as the flash players previously described (e.g., the JW FLV Player, Flowplayer, or Adobe Open Source Media Framework (OSMF)). A navigation device, shown as a status bar 1403, can optionally be provided by the playback mechanism.

A storyboard 1404 can be included to display various scenes within the content and to allow a viewer (e.g., a previewing content provider or a content consumer) to navigate to particular sections of the multimedia content. In the embodiment shown, a thumbnail within the storyboard 1404 is highlighted that corresponds to the current scene being displayed in the active window 1402. In certain embodiments, the storyboard is editable by both content producers and content consumers; both can elect to tag or otherwise identify locations in the video (e.g., highlights) and share those locations with other users.

An information window 1406 displays any included accompanying text that is associated with a particular object of interest being displayed. In the example illustrated, a message "Message Here" is displayed during the time the person is displayed in the active window 1402, as defined in the preceding example in FIG. 10. Additionally, a hyperlink can be included in the information window 1406, and can be used to define a link to other content or information relevant to the displayed scene. As previously explained, other actions can be associated with that object of interest (or a different object of interest) as well.

A search field 1408 and search results field 1410 allow a user (e.g., a content producer or consumer) to search video metadata stored at a multimedia processing system while the user is viewing the video. Search data results can be selected to move to a new section of the current video or to a specific section of a different video. The search results can be represented in the search results field 1410 as graphical scenes, portions of a transcript associated with the content, or other recognizable elements.

The search performed within the content can certain embodiments, be performed based on natural language processing of an existing transcript (closed captioning or subtitles file provided by the content provider) or from a new transcript created using speech to text technology and edited by the content provider. Example methods for generating such a transcript are described in conjunction with FIG. 11, above. In addition to (or in lieu of) the transcript, a content provider can also provide a text file that annotates the video, but is not a transcript of the voices in the content. This text file can also be used to enhance the search capability through the content. The enhanced search systems allow a user to perform intelligent searches within content processed by the multimedia processing system, using the metadata and other information stored (e.g. in database 626) as each video is processed. Each time a video is processed, additional information can be added to the stored information that is available to be searched, either within the video or as made available for indexing by larger search engines external to the multimedia processing system.

In the embodiment shown, an advertisements field 1412 can be configured to display advertisements that are related to the items mentioned or depicted in the active window 1402. Content providers and their advertisers can provide up-to-date information on products, specials or other items to the viewer of the content, and can tailor this information based on known user information. In certain embodiments, broadcast or multicast advertising can be associated with one or more of the videos to overlay dynamic content, e.g. time-sensitive information or specials (such as a special sale on a related product or service).

In use, a content consumer requesting multimedia content will receive the content and associated metadata defining one or more objects of interest and actions to be taken associated with those objects of interest. In the example shown, a house and a person are illustrated as defined objects of interest (as explained above with respect to FIGS. 9-10). Depending upon the preferences of the content consumer, one or both of these defined objects of interest may be defined by the metadata actually provided to the consumer. In the embodiment shown, the person is a defined object of interest to the consumer, and information associated with the person is displayed. The content consumer can then opt to review the content and information (denoted as "Message Here"), and optionally can click on a hyperlink to cause an action defined by a user selection event associated with the object of interest in the information window 1406 (e.g., in the case of a person, to view additional information about that person, such as biographical information or other content in which the person appears).

It is recognized that, based on a different set of preferences, a different content consumer may view the same content in the active window 1402, but would be presented with different information in the information window 1406, based on a different object of interest. For example, a second user may have indicated a preference or history for viewing information about architecture, so that user may see information about the house as a defined object of interest, with one or more associated user selection events related to the house (e.g., carpentry, do-it-yourself projects, etc.). Alternatively, the same object of interest could be selected for inclusion in the metadata associated with the second user, but different information or different user selection events could be provided, such that a first user could be linked to biographical information of the person defined as an object of interest while a second user could be linked to alternative content.

Furthermore, and beyond objects of interest, it is recognized that different aspects of the metadata provided for playback can be customized for each user, or can otherwise be changed by a content provider. For example, additional objects of interest could be defined, different advertisements could be defined to be displayed to the content consumers based on their geographical location or preferences, or search results could be prioritized differently.

Additionally, in certain embodiments, the same objects of interest can be defined for different users or for the same user at two different times, but different user selection events could be associated with the same event. For example, a limited-time sale or regional sale on an item appearing as an object of interest may link to a vendor during the time of the sale or for customers determined to reside in that region (e.g. by IP or MAC address), but may otherwise link to other information about the item. Other customizations can be provided using the metadata defined using the multimedia processing systems of the present disclosure as well.

In addition to the customized content, the user interface 1400 provides a feedback mechanism for tracking content consumer actions associated with the multimedia content. For example, the user interface 1400 can receive selections of the objects of interest or user selection events, or can register navigation through the content (e.g. using the status bar 1403) to capture analytics data for future decisionmaking regarding objects of interest, events, advertisements, and other customizations and enhancements to be provided alongside the multimedia content.

Referring now to FIGS. 15-16, methods and systems for detecting positions of objects within a scene in video content are disclosed. The methods and systems disclosed can be used, for example, in a multimedia processing system to automatically detect the positions of objects within a scene, thereby assisting with locating objects of interest in the content, determining a three-dimensional spatial layout of the objects, or other features.

FIG. 15 is a flowchart of methods and systems 1500 for detecting positions of objects within a scene in video content, according to a possible embodiment of the present disclosure. The method of FIG. 15 is instantiated at a start operation 1502, which corresponds to initial setup of a physical scene to be captured as multimedia content. This initial setup will typically be performed by a content producer or some entity related thereto. A tag operation 1504 corresponds to applying one or more location determination tags to objects to be tracked within the scene. The tags applied can take any of a number of forms; in certain embodiments, the tags are radio frequency identification (RFID) tags, configured to respond to interrogations by an RFID reader by transmitting their identity and position. In other embodiments, the tags could be other types of position sensors, such as infrared, Bluetooth or other types of sensors.

A capture content operation 1506 corresponds to capture of multimedia content, such as using one or more video cameras, microphones, and corresponding digital conversion software for translating the captured content to a recognizable format. Concurrently with the capture content operation, a capture position operation 1508 receives periodic information from each of the tagged objects, such as by interrogation from an RFID reader or other positional data collection device. The positions captured by the capture position operation 1508 can be, in various embodiments, absolute positions (e.g. determined by GPS sensor positioning) or positions relative to a camera capturing video of those objects. By concurrently capturing both multimedia content and position information, the content and positions of objects within the content can be synchronized.

An object detection operation 1510 detects one or more of the tagged objects within the now-electronic multimedia content, such as by using one or more of the algorithms discussed above regarding detection of objects of interest. In certain embodiments, one or more image detection programs can be used, as previously described. An object identification operation 1512 then associates the objects detected in the multimedia content with the positional information received in the capture position operation 1508. An optional user confirmation operation 1514 receives an indication from the user confirming that the objects of interest are in fact those associated with the positional information.

A location extrapolation operation 1516 extrapolates locations of the objects of interest within the multimedia content based on the relative positions of the objects as known from the positional information. For example, two items located 5 feet apart when captured may be calculated to be approximately 100 pixels apart, assuming a known resolution at which the multimedia content is captured (e.g., 1080×720, or other resolution) and depending upon an angle at which the objects are being filmed, a distance from the capturing camera, and other known factors.

Based on the positions of the physical objects, including global positions of the objects as well as relative positions of the objects, the location extrapolation operation 1516 determines relative positions among identified objects in the multimedia. For example, the location extrapolation operation 1516 can be configured to build a model of the relative positions of the objects, and flatten that model to a two dimensional representation from a particular perspective, which will allow the model to determine approximately where the corresponding objects should appear in video content. Other methods of extrapolating location are available as well.

A metadata generation operation 1518 generates metadata associated with the objects to define the objects as objects of interest, such as by using the methods and systems described above. The metadata generation operation 1518 can generate various types of metadata such as the video metadata 634 and position metadata 636 described above with respect to FIG. 6. The method 1500 terminates at an end operation 1520, once positions of the desired objects of interest have been determined within the multimedia content.

FIG. 16 is a schematic view of a video capture and processing arrangement 1600, useable for detecting positions of objects within a scene in video content using aspects of the present disclosure. The arrangement 1600 illustrates an example of capturing a simple video including a pair of potential objects of interest, a person 1602 and a tree 1604. The person 1602 is tagged with a first location sensing tag (illustrated as RFID tag 1603) and the tree 1604 is tagged with a second location sensing tag (illustrated as RFID tag 1605). A camera 1606 can capture video data of a scene within a field of view 1608 of that camera, including the person 1602 and tree 1604; concurrently, a location receiver (e.g., RFID reader 1610) can capture location information related to the objects of interest (the person 1602 and tree 1604) from the associated tags (1603 and 1605, respectively).

The video data and position data can be passed to a multimedia processing system 1612. The multimedia processing system 1612 can be any of a number of large-scale computing systems or clusters as previously described. At the multimedia processing system, the captured video 1614 and position information 1616 are fed to an object detection module 1618 and a position determination module 1620, which cooperate to detect objects of interest in the captured scene as well as their relative positions within a captured video.

Referring to FIGS. 15-16 overall, it can be seen that the position data obtained using these methods and systems can be integrated with objects of interest and user selection events in metadata to further customize the display of multimedia content to a content consumer. For example, a scene including a particular landmark as detected using latitude and longitude, GPS, or relative positional information could be linked to travel websites associated with trips to the same location, or information relating to the landmark such as maps or other information. Smaller-scale relationships between Objects could be linked to other information as well (e.g., relative movements of two individuals could be linked to instructional videos regarding dancing, or relative positions between two objects could be associated with architectural design or interior design information it that can be linked to via user selection events). Other possibilities exist as well for relating positional information to objects of interest, as well as for detecting objects of interest based on positional information.

Referring now to the overall methods and systems described herein, it is recognized that the multimedia processing system described allows customized content viewing experiences for users, and allows for tracking of information regarding objects, locations, and text of interest to the various content consumers, as defined by metadata associated with content. The methods and systems allow a content consumer to be matched to particular metadata (e.g., by the multimedia processing system or other third-party systems) best suited to that consumer. This allows for customized viewing experiences for each content consumer without requiring reprocessing of the multimedia content itself for each consumer. This also allows for improved selection of enhancements and advertisements to provide to each consumer, improving the likelihood that each object of interest will in fact induce the content consumer to act (e.g., by following through on the user selection event, whether to view supplemental content, purchase a related product, or perform other actions).

Additionally, it is recognized that large-scale processing of multimedia content will be compute-intensive; therefore, the various computing arrangements of FIGS. 1-5 are advantageous for forming the systems of a multimedia processing system as described herein. For example, such systems can be used and job-shared among a variety of content providers. These content providers can be billed on a "pay as you go" or other reduced cost basis, based on amounts of computing time, network bandwidth, and/or storage are used. The methods and systems of the present disclosure therefore make more widely available the infrastructure necessary for content providers who would not otherwise have computing capabilities for creating interactive or enriched multimedia content. Other advantages of the methods and systems of the present disclosure exist as well, as are apparent from the previous description and the appended claims.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of converting speech to text, the method comprising:
 analyzing multimedia content using one or more computing devices to determine the presence of closed captioning data;
 upon detecting closed captioning data, causing at least one of the one or more computing devices to begin:
  i) indexing the closed captioning data as associated with the multimedia content;
 upon failure to detect closed captioning data in the multimedia content causing at least one of the one or more computing devices to begin:
  i) extracting audio data from multimedia content, the audio data including speech data;
  ii) performing a plurality of different speech to text conversions on the speech data to create a plurality of transcripts of the speech data, the plurality of different speech to text conversions include speech to text conversion processes from different software vendors, wherein at least one of the plurality of transcripts is different from a remainder of the plurality of transcripts, wherein at least one of the speech to text conversions uses a context-sensitive speech to text dictionary selected according to the subject matter of the multimedia content;
  iii) selecting text from among the plurality of transcripts to form an amalgamated transcript; and
  iv) indexing the amalgamated transcript as associated with the multimedia content, wherein indexing the amalgamated transcript includes storing metadata associating text in the amalgamated transcript to timestamps associated with the multimedia content.

2. The method of claim 1, further comprising:
 analyzing the multimedia content to detect subtitle information; and
 upon detecting subtitle information, indexing the subtitle information as associated with the multimedia content.

3. The method of claim 1, further comprising associating the indexed closed captioning data or amalgamated transcript with metadata describing the multimedia content.

4. The method of claim 1, wherein indexing the amalgamated transcript comprises associating indexed portions of the multimedia content with a query engine.

5. The method of claim 1, wherein each of the plurality of speech to text conversions is performed by a corresponding speech to text conversion program.

6. The method of claim 5, further comprising training the speech to text program.

7. The method of claim 6, wherein training the speech to text conversion program includes training the speech to text conversion program using speech patterns specific to a presenter whose speech data is included in the multimedia content.

8. The method of claim 6, wherein training the speech to text conversion program includes training the speech to text conversion program using a speech to text dictionary in a training mode of the speech to text conversion program.

9. The method of claim 8, wherein the speech to text dictionary is a context-sensitive dictionary selected according to the subject matter of the multimedia content.

10. The method of claim 1, further comprising selecting a subject-specific speech to text dictionary related to the multimedia content.

11. The method of claim 1, further comprising receiving a script alongside the multimedia content and including at least a portion of the script in a transcript indexed to the multimedia content.

12. The method of claim 1 wherein the one or more computing devices comprise a single computing device.

13. A system for converting speech to text, the system comprising:
one or more computing systems each including a programmable circuit and a memory, the one or more computing systems executing program instructions, which, when executed, cause the one or more computing systems to:
i) analyze multimedia content to determine the presence of closed captioning data;
ii) upon detecting closed captioning data: index the closed captioning data as associated with the multimedia content;
iii) upon failure to detect closed captioning data in the multimedia content: extract audio data from multimedia content, the audio data including speech data; perform a plurality of different speech to text conversions on the speech data to create a plurality of transcripts of the speech data, the plurality of different speech to text conversions include speech to text conversion processes from different software vendors, wherein at least one of the plurality of transcripts is different from a remainder of the plurality of transcripts, and wherein at least one of the speech to text conversions uses a context-sensitive speech to text dictionary selected according to the subject matter of the multimedia content; select text from among the plurality of transcripts to form an amalgamated transcript; and index the amalgamated transcript as associated with the multimedia content, wherein indexing the amalgamated transcript includes storing metadata associating text in the amalgamated transcript to timestamps associated with the multimedia content.

14. The system of claim 13, wherein the closed captioning data or amalgamated transcript is associated with metadata describing the multimedia content.

15. A system for converting speech to text, the system comprising:
an analysis module operating on one or more computing systems and configured to analyze multimedia content to determine the presence of closed captioning data;
an audio extraction module operating on one or more computing systems, the audio extraction module configured to extract audio data from multimedia content, the audio data including speech data;
a plurality of speech to text conversion programs operating on one or more computing systems, each of the plurality of speech to text conversion programs operating on the speech data to create a plurality of transcripts of the speech data, the plurality of speech to text conversion programs include programs from different software vendors, and at least one of the plurality of speech to text conversion programs uses a context-sensitive speech to text dictionary selected according to the subject matter of the multimedia content, wherein at least one of the plurality of transcripts is different from a remainder of the plurality of transcripts;
a transcript selection module configured to select text from one or more of the plurality of transcripts to form an amalgamated transcript; and
an indexing module operating on the one or more computing systems and configured to,
upon detecting closed captioning data:
index the closed captioning data as associated with the multimedia content; and
upon failure to detect closed captioning data in the speech data:
index the amalgamated transcript as associated with the multimedia content, wherein indexing the amalgamated transcript includes storing metadata associating text in the amalgamated transcript to timestamps associated with the multimedia content.

16. The system of claim 15, wherein the analysis module is further configured to analyze the multimedia content to detect subtitle information, and the indexing module is further configured to, upon detecting subtitle information, index the subtitle information as associated with the multimedia content.

17. The system of claim 15, further comprising a training module operating on the one or more computing systems and configured to train the one or more speech to text programs using speech patterns specific to a presenter whose speech data is included in the multimedia content.

18. The system of claim 15, wherein the training module selects a subject-specific speech to text dictionary related to the multimedia content.

19. The system of claim 15, wherein the closed captioning data or amalgamated transcript is associated with metadata describing the multimedia content.

20. The system of claim 15, wherein the indexing module is configured to store metadata associating text in the amalgamated transcript to timestamps associated with the multimedia content.

21. A method of converting speech to text, the method comprising:
using one or more processors to train one or more speech to text programs using a context-sensitive speech to text dictionary selected according to the subject matter of the multimedia content;
analyzing the extracted speech data using at least one of the one or more processors to determine the presence of closed captioning data;

upon detecting closed captioning data: using at least one of the one or more processors to begin indexing the closed captioning data as associated with the multimedia content;

upon failure to detect closed captioning data in the speech data, causing at least one of the one or more processors to begin:
   i) extracting audio data from multimedia content, the audio data including speech data; performing a plurality of different speech to text conversions on the speech data using the one or more speech to text programs to create a plurality of transcripts of the speech data, wherein each of the plurality of transcripts is different from a remainder of the plurality of transcripts and the speech to text programs each associated with different software vendors;
   ii) selecting text from one or more of the plurality of transcripts to form an amalgamated transcript; and
   iii) indexing the amalgamated transcript as associated with the multimedia content by storing metadata associating text in the amalgamated transcript to timestamps associated with the multimedia content.

22. The method of claim 21 wherein the one or more processors comprise a single processor.

* * * * *